Figure 1:
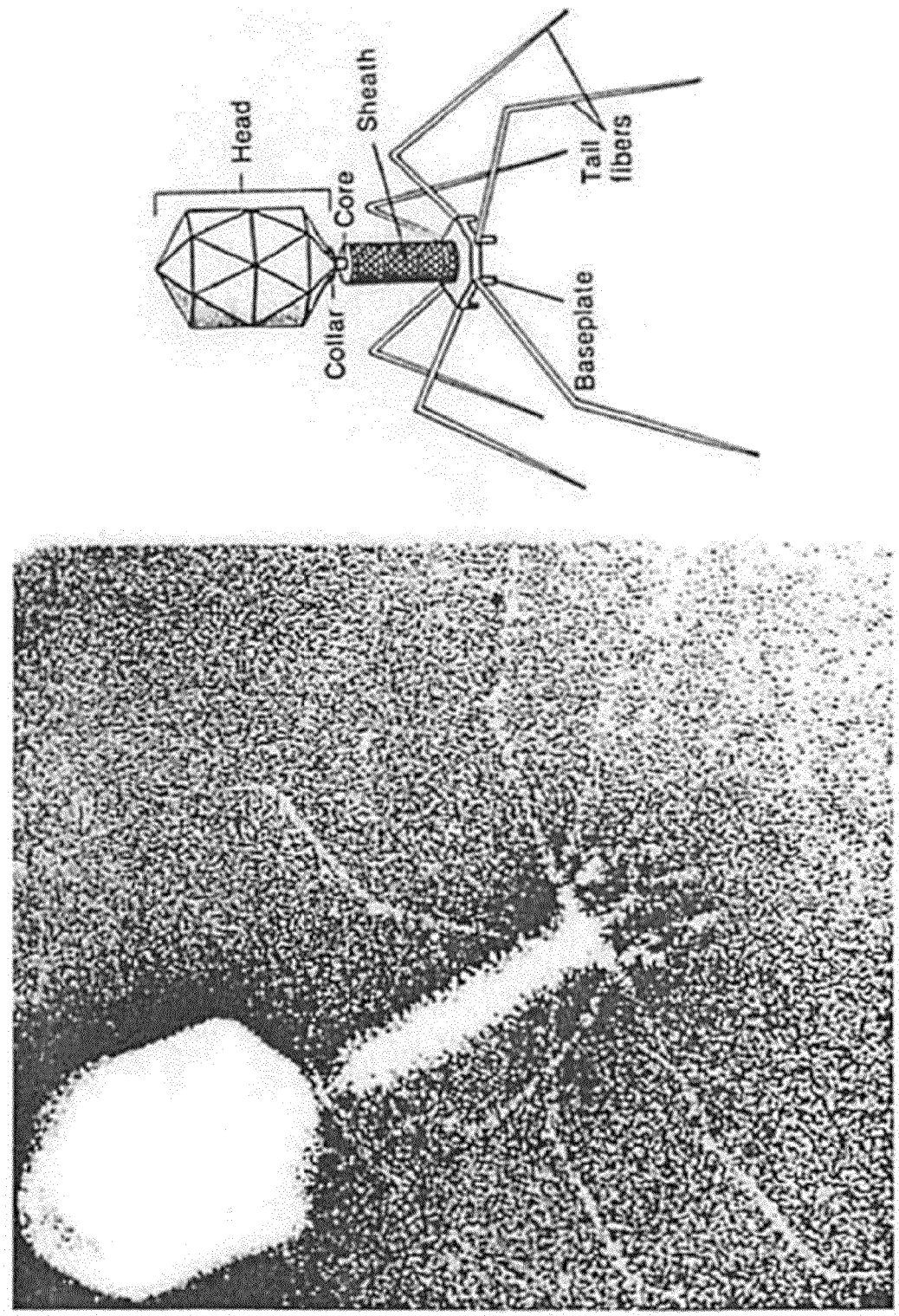
Figure 2:
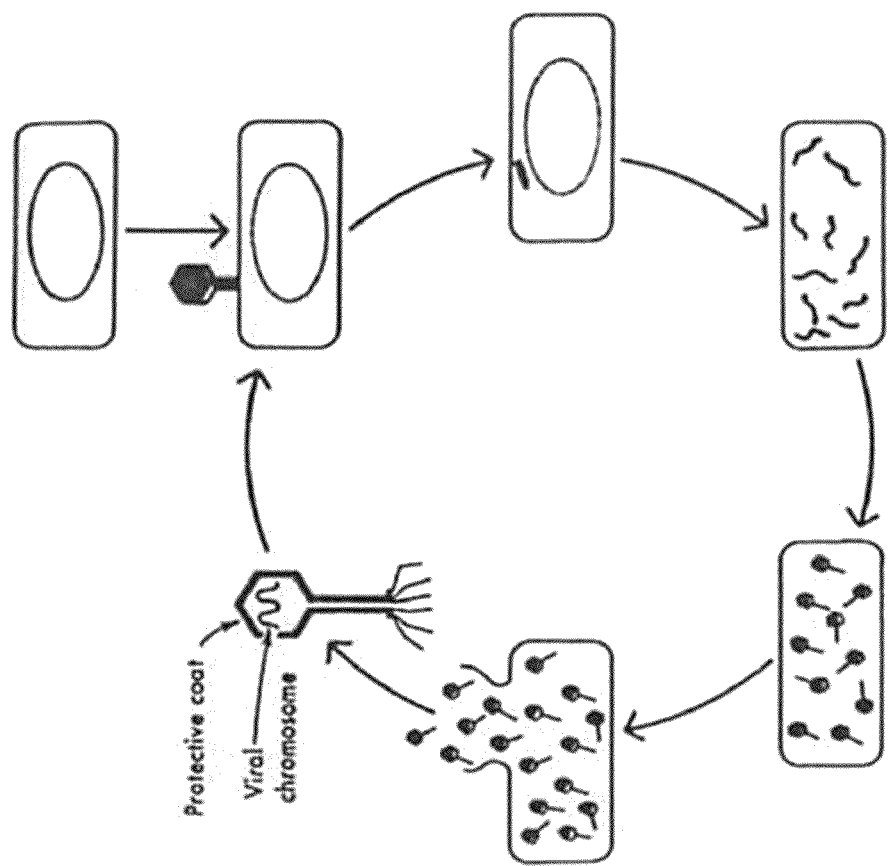
Figure 3:
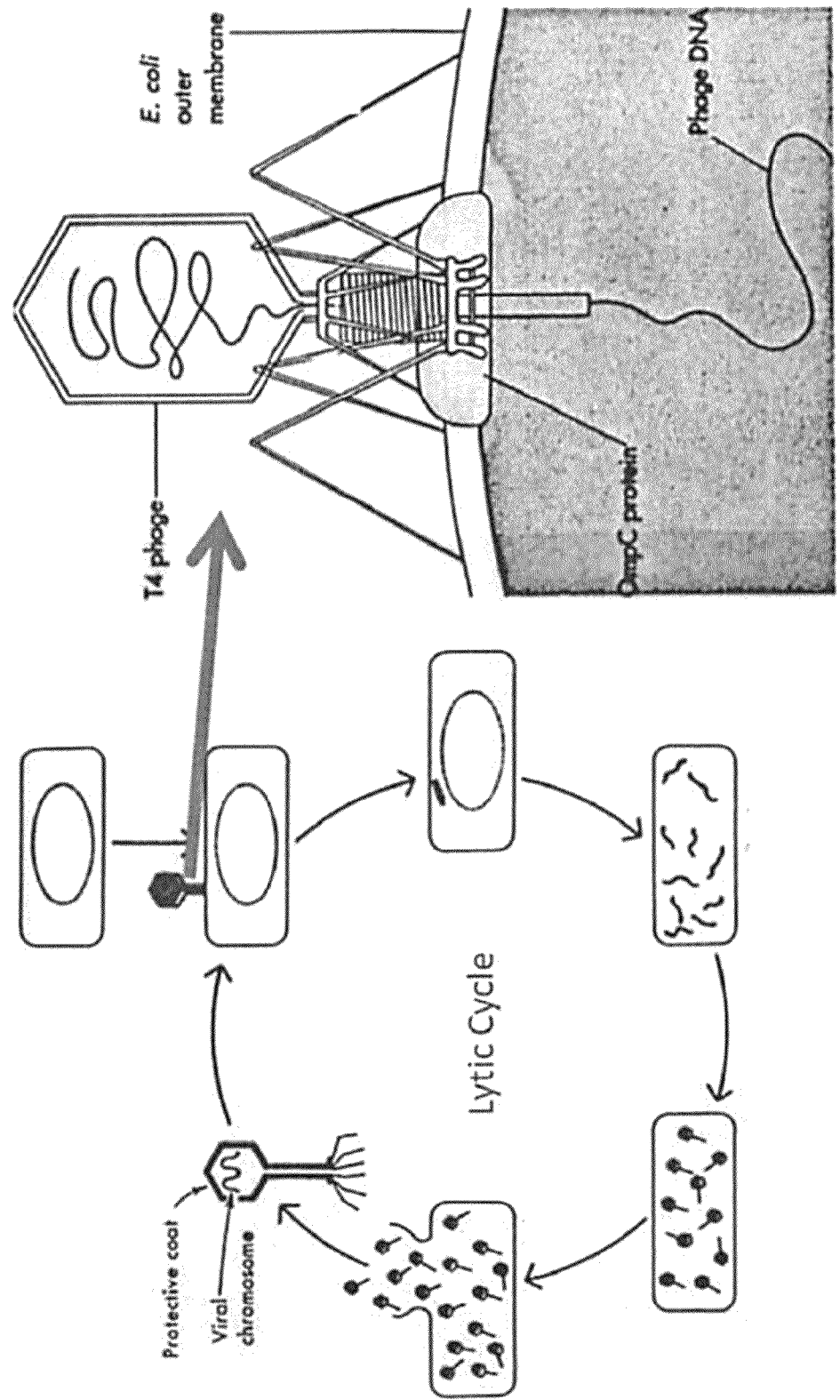

US009370172B2

(12) United States Patent
Amy et al.

(10) Patent No.: US 9,370,172 B2
(45) Date of Patent: Jun. 21, 2016

(54) **LYSING *PAENIBACILLIS LARVAE* BY EXPOSURE TO PHAGE**

(71) Applicant: The Board of Regents of the Nevada System of Higher Education on behalf of the Univeristy of Nevada, Las Vegas, NV (US)

(72) Inventors: Penny S. Amy, Henderson, NV (US); Diane Gerda Yost, Las Vegas, NV (US)

(73) Assignee: The Board of Regents of the Nevada System of Higher Education on Behalf of the University of Nevada, Las Vegas, Las Vegas, NV (US)

(*) Notice: Subject to any disclaimer, the term of this patent is extended or adjusted under 35 U.S.C. 154(b) by 157 days.

(21) Appl. No.: 14/162,638

(22) Filed: Jan. 23, 2014

(65) Prior Publication Data

US 2014/0213144 A1 Jul. 31, 2014

Related U.S. Application Data

(60) Provisional application No. 61/758,983, filed on Jan. 31, 2013.

(51) Int. Cl.
*A01K 51/00* (2006.01)

(52) U.S. Cl.
CPC .................................. *A01K 51/00* (2013.01)

(58) Field of Classification Search
CPC ............................ A01K 47/00; A01K 51/00
See application file for complete search history.

(56) References Cited

U.S. PATENT DOCUMENTS 8,507,769 B1 * 8/2013 Delzer .................... A01H 5/10
435/412

OTHER PUBLICATIONS

'American Society for Microbiology,' [online]. "Researchers Search for Viruses to Save Honeybees," Jun. 18, 2012, [retrieved on Oct. 3, 2012]. Retrieved from the Internet: <URL: http://gm.asm.org/index.php/component/content/article/48/315-researchers-search-for-virus>. 2 pages.

'United States Department of Agriculture,' [online] "New Treatments for American Foulbrood: Using the Microbe's Biology Against It," 2011, [retrieved on Dec. 3, 2012]. Retrieved from the Internet: <URL: http://www.reeis.usda.gov/web/crisprojectpages/0224189-new-treatments-for-american-foulbrood-using-the-microbes-biology-against-it.html, 5 pages.

Alippi et al., "Comparative study of tylosin, erythromycin and oxytetracycline to control American Foulbrood of honey bees," J Apis Res 38:149-158, 1999.

Australian Government "Honeybee Research Report 2006," May 2006, 29 pages.

Bastos et al., "In vitro study of the antimicrobial activity of Brazilian propilis against *Paenibacillus larvae*," J Invertebr Path 97:273-281, 2008.

Campana et al., "Morphology of *Bacillus larvae* bacteriophage PBL3 and physical map of its DNA," J Invertebr Path 57:141-143, 1991.

Crailsheim et al., "Standard methods for artificial rearing of *Apis mellifera* larvae," J Apicultural Res., 2013, 52(1):1-16.

(Continued)

*Primary Examiner* — Kathleen Alker
(74) *Attorney, Agent, or Firm* — Ballard Spahr LLP

(57) ABSTRACT

Materials and Methods for lysing a strain of *Paenibacillus larvae* that is not *P. larvae* 2605, including methods for providing to an environment of a bee hive infected with the strain of *P. larvae* a lysing phage that also lyses with *P. larvae* 2605.

12 Claims, 19 Drawing Sheets

(56) References Cited

OTHER PUBLICATIONS

De Graaf et al., "Diagnosis of American foulbrood in honey bees: a synthesis and proposed analytical protocols," Lett App Microbiol, 43:583-590, 2006.
Dietemann et al., The Coloss Beebook, vol. 1; Standard Methods for *Apis mellifera* Research: Introduction, J Apicultural Res., 2013, 52(4):1-4.
Dingman et al., "Isolation of two bacteriophages from *Bacillus larvae*, PBL1 and PBL0.5, and partial characterization of PBL1," J Gen Virol, 65:1101-1105, 1984.
Drobnikova and Ludvik, "Bacteriophage of *Bacillus larvae*," J Apicultural Res 21:53-56, 1982.
Evans, "Diverse origins of tetracycline resistance in the honey bee bacterial pathogen *Paenibacillus larvae*," J Invertebr Path 83:46-50, 2003.
Gochnauer and L'Arrivee, "Experimental infections with *Bacillus larvae*. II. Bacteriophage production in the host," J Invertebrate Pathol 14:417-418, 1969.
Gochnauer, "Some properties of a bacteriophage from *Bacillus larvae*," J Invertebr Pathol 15:149-156, 1970.
Gochnauer, "The isolation of a bacteriophage (bacterial virus) from *Bacillus larvae*," Bee World. 36: 101-103, 1955.
Hurst and Reynolds, "Sampling viruses from soil," In: *Manual of environmental microbiology*, Ed. Hurst, Crawford, and McInerney, 2nd ed., American Society for Microbiology Press, Washington, D.C., pp. 527-534, 2002.
Mayer et al., "Rapid plate test for evaluating phage induction capacity," Appl Microbiol 18:697-698, 1969.
Miller, "Methods for enumeration and characterization of bacteriophages from environmental samples," In: Techniques in Microbial Ecology, Ed. Burlage, Atlas, Stahl, Geesey, and Sayler, Oxford University Press, pp. 218-233, 1998.
Peng et al., "Effects of chlortetracycline on honey-bee worker larvae reared in vitro," Journal of Invertebrate Pathology 60: 127-133, 1992.
Piccini et al., "Detection of *Paenibacillus larvae* subspecies larvae spores in naturally infected bee larvae and artificially contaminated honey by PCR," World J Microbiol Biotechnol 18:761-765, 2002.
Popova et al., "Bacteriophage of *Bacillus larvae*," Compte rendu de l'Academie Bulgare des Sciences, 28:249-252, 1976.
Smirnova, "A bacteriophage against *Bacterium larvae*: its use in the diagnosis, prophylaxis and therapeutics of American foulbrood, " Summary of a thesis: Veterinary Institute of the Department of Higher Education at Leningrad, 1954, 20 pages.
Valerianov et al., "Isolation from soil of a bacteriophage lysing *Bacillus larvae*," Acta Microbiotogica, Virologica et Immunologica (Bulgarian Academy of Sciences) 4, 81-85, 1976 (English abstract on p. 85).
Wang et al., "Holins: The protein clocks of bacteriophage infections," Annu Rev Microbiol, 54:799-825, 2000.
Woodrow, "Susceptibility of honeybee larvae to individual inoculations with spores of *Bacillus larvae*," J Econ Entomol, 35:892-895, 1942.
Yost, "Researching bacteria-eating viruses as a potential treatment for a honeybee disease," Am Soc Microbiol, Jun. 18, 2012, 1 page.
Yost, "Sources and characterization of bacteriophages capable of lysing *Paenibacillus larvae*," Powerpoint, Jun. 21, 2013, 17 pages.

\* cited by examiner

Figure 7

| Isolated Phage | *Paenibacillus larvae* | | | | | | | | | | Percentage of Strains that Phage can Form Plaques On |
|---|---|---|---|---|---|---|---|---|---|---|---|
| | 2605 | 2188 | 3554 | 748 | 747 | 3688 | 2231 | 367 | 843 | 368 | |
| H1P | | | | | | | | | | | 100% |
| V | | | | | | | | | | | 100% |
| H1S | | | | | | | | | | | 100% |
| H2S | | | | | | | | | | | 90% |
| H3S | | | | | | | | | | | 90% |
| PAIS2 fl. | | | | | | | | | | | 80% |
| D | | | | | | | | | | | 80% |
| H5S | | | | | | | | | | | 80% |
| E | | | | | | | | | | | 80% |
| VIII | | | | | | | | | | | 80% |
| VII | | | | | | | | | | | 80% |
| XIII | | | | | | | | | | | 40% |

Figure 8

| Isolated Phage | *Paenibacillus larvae* | | | | | | | | | |
|---|---|---|---|---|---|---|---|---|---|---|
| | 2605 | 2188 | 3554 | 748 | 747 | 3688 | 2231 | 367 | 843 | 368 |
| * | 30 | 30 | 26 | 23 | 21 | 19 | 18 | 16 | 13 | 11 |
| ** | 1 | 1 | 0.87 | 0.77 | 0.7 | 0.63 | 0.6 | 0.53 | 0.43 | 0.37 |

*Number of phage that can form plaques on target strain (30)
** Proportion of susceptibility

8/6/2013

6/28/2013

LYSING PAENIBACILLIS LARVAE BY EXPOSURE TO PHAGE

CROSS-REFERENCE TO RELATED APPLICATIONS

This application claims benefit of priority from U.S. Provisional Application Ser. No. 61/758,983, filed on Jan. 31, 2013.

STATEMENT AS TO FEDERALLY SPONSORED RESEARCH

This invention was made with government support under 2011-67013-30169, awarded by the United States Department of Agriculture. The government has certain rights in the invention.

TECHNICAL FIELD

This document relates to materials and methods for treating and preventing American Foulbrood disease in honeybees, and more particularly to materials and methods for using phage to lyse Paenibacillus larvae in honeybees.

BACKGROUND

Honeybees pollinate agricultural crops and native plant species around the world. Without the effort of the bees, many food supplies would suffer. The use of industrially imported and transported bees is not a trivial endeavor. Some large bee pollination companies have a million or more hives. Such operations may truck hundreds of thousands of bee hives across the United States, e.g., to California to pollinate the almond crop grown each year. These same hives are then trucked back across the country to pollinate blueberries and other crops that bloom later than almonds. Some people make their living from harvesting honey from their bee hives. Many bee hives are kept by amateur bee keepers who enjoy the hobby and inadvertently help neighbors through the work of their bees.

An aggressive loss of bee hives has begun to devastate the world's bee population. The loss is called Colony Collapse Disorder and its entire cause is not known. Some believe it is due to systemic pesticides used on large monoculture agricultural crops. In addition to outright death of the hives, Colony Collapse Disorder causes hives to be weakened and made vulnerable to a number of infections.

A long known infection suffered by bees is caused by the bacterium, Paenibacillus larvae. While the associated disease is called American Foulbrood disease (AFB), it is found worldwide. Infection with P. larvae is a serious disease of honeybees that eventually destroys the infected hive and further infects other hives. AFB affects the earliest stages of the larval development, just after the eggs are hatched. The young larvae are digested from the inside out by the bacteria. With the loss of the brood, the colony has no chance to recover.

Various treatments have been used for AFB, including antibiotics such as Oxytetracycline HCl and Tylosin tetrate. The bacteria quickly became resistant to the antibiotic, however, and residue from the chemicals has been found in honey. Thus, such treatment is not acceptable to the public. Additionally, the introduction of antibiotics into the environment can have serious secondary effects, such as causing other bacteria to develop general resistance to antibiotics.

The primary current treatment for the presence of P. larvae is burning of the hives, the bees, and the equipment used to support the beekeeping of that hive. State departments of agriculture have inspectors who test for the presence of P. larvae, and the treatment typically is done quickly. This is a drastic treatment, however, and the industry has been hesitant to impose regulations on the inspection and treatment of hives, or to provide any other meaningful regulations to find and address infections.

SUMMARY

This document is based in part on the discovery that P. larvae can be lysed by introducing phage into a bee hive, such that the phage can physically associate with and lyse the P. larvae.

In one aspect, this document features a method of deterring a first strain of P. larvae that is not P. larvae 2605, where the method can include providing to an environment of a bee hive infected with the first strain of P. larvae an isolated lytic phage that lyses P. larvae 2605 and deters productive replication of P. larvae 2605. The lysing phage can be provided by delivering food for bees that contains the lysing phage to the bee hive. Lysing of the first strain of P. larvae can cause a hole in the peptidoglycan of a cell wall of the first strain of P. larvae and cell membrane of the first strain of P. larvae which is externalized after internal pressure force the cell membrane outside the hole in the cell wall, leading to rupture of the cell membrane and loss of intercellular components. Rupture of the cell membrane can lead to death of the first strain of P. larvae.

In another aspect, this document features a method of deterring a first strain of P. larvae that is not P. larvae 2605, where the method can include providing to an environment of a bee hive infected with the first strain of P. larvae a lysing phage that lyses P. larvae 2605 and at least two other strains of P. larvae selected from the group consisting of ATCC Numbers 9545, 25367, 25368, 25747, 25748, and 49843. The lysing phage can be provided by delivering food for bees that contains the lysing phage to the bee hive. Lysing of the first strain of P. larvae can causes a hole in the peptidoglycan of a cell wall of the first strain of P. larvae and cell membrane of the first strain of P. larvae which is externalized after internal pressure force the cell membrane outside the hole in the cell wall, leading to rupture of the cell membrane and loss of intercellular components. Rupture of the cell membrane can lead to death of the first strain of *P. larvae*. The first strain of *P. larvae* that is not *P. larvae* 2605 can deter productive replication of *P. larvae* 2605 and the at least two other strains of *P. larvae*.

In another aspect, this document features a method for treating a *P. larvae* infection in a honeybee, where the method can include administering to the honeybee a composition comprising a lytic phage that is capable of lysing *P. larvae* 2605 and deterring productive replication of *P. larvae* 2605, where the *P. larvae* infection in the honeybee is not an infection by *P. larvae* 2605. The composition can contain one or more lytic phages that are capable of lysing *P. larvae* 2605 and at least two other strains of *P. larvae* selected from the group consisting of ATCC Numbers 9545, 25367, 25368, 25747, 25748, and 49843. The composition can include honeybee larvae food.

In still another aspect, this document features a method for reducing the risk of *P. larvae* infection in a honeybee, where the method can include administering to the honeybee a composition comprising a lytic phage that is capable of lysing *P. larvae* 2605 and deterring productive replication of *P. larvae* 2605, wherein the *P. larvae* infection is not an infection by *P. larvae* 2605. The composition can contain one or more lytic phages that are capable of lysing *P. larvae* 2605 and at least two other strains of *P. larvae* selected from the group consisting of ATCC Numbers 9545, 25367, 25368, 25747, 25748, and 49843. The composition can contain honeybee larvae food.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 shows the structure of a bacteriophage as observed via electron microscopy (left panel) and in a diagram (right panel).

FIG. 2 is a graphic depicting replication of a bacteriophage during a lytic cycle.

FIG. 3 is a graphic that more completely depicts the replication stage during the bacteriophage lytic cycle.

FIG. 4 is a graphic representation of a complete lysogenic cycle for a bacteriophage.

FIG. 5 is a graphic representation of a lysin system. The left panel shows the structure of bacterial cell outer membranes and peptidoglycan, with a phage holin in the cell membrane. The right panel depicts various peptidoglycan bonds that are targeted by different lysins. Cleavage of any one of these bonds can degrade the cell wall.

FIG. 6 is a table indicating the efficacy of various phage against *P. larvae*.

FIG. 7 is a table indicating isolated phage effects as a Host Range of Phage on *P. larvae*.

FIG. 8 is a table indicating isolated phage effects as a Host Range of Phage on *P. larvae*.

FIG. 9 is a series of representative images of phage lysis on a bacterial lawn. Letters correspond to the descriptions in Table 4 and are specified by superscripts.

FIG. 10 is a graph plotting susceptibility of *P. larvae* strains to phage lysis, graphed as the proportion of each bacterial strain capable of being lysed by phages. *P. larvae* strains are grouped by former subspecies. Bacterial strains are listed from back to front.

FIG. 11 is a series of scanning electron microscope (SEM) images of phages, labeled as follows: A, A; B, H3S; and C, H1P. Scale bars (in the bottom black border) are 50 nm for A and 100 nm for H3S and H1P.

FIG. 12 is a graph plotting the mean proportion of larvae surviving from the following treatments: negative control (dashed line), food with GmBHI added (solid line), and food with water added (dotted line). Error bars represent the standard deviation.

FIG. 13 is a graph plotting the mean proportion of larvae surviving infection with vegetative cells from *P. larvae* ATCC 49843, NRRL B-3554, and isolated 2188, as indicated. Error bars represent the standard deviation.

FIG. 14 is a graph plotting the mean proportion of larvae surviving after infection with *P. larvae* spores from the following strains: ATCC 49843, NRRL B-3554, and isolated 2188, as indicated. Two infections using spores from 2188 were conducted—one with daily doses of spores and one with a single dose on the first day. Error bars represent the standard deviation.

FIG. 15 is a graph plotting the mean proportion of larvae surviving after treatment with phage cocktail #1. Larvae were fed spores, phage cocktail, spores and then phage cocktail, or phage and then spores, as indicated. Error bars represent the standard deviation.

FIG. 16 is a graph plotting the mean proportion of larvae surviving after treatment with phage cocktail #2. Larvae were fed spores, phage cocktail, spores and then phage, or phage and then spores, as indicated. Error bars represent standard deviation.

FIG. 17 is a graph plotting the mean survival rate for a comparison of the average of 11 control treatments to the phage cocktail #2 treatment, and the negative control replicate that corresponds to treatment. Error bars represent the standard deviation. Error bars are not present on the negative control (solid line) because it represents only one replicate.

FIG. 18 is a graph plotting the proportion of deceased larvae that tested positive for *P. larvae* DNA by PCR and gel electrophoresis.

FIG. 19 is a pair of images of the same frame taken 5.5 weeks apart during experimental treatment of the hive. The image on the left shows dark comb and characteristic sunken capped cells, while the image on the right is slightly lighter and has fewer sunken capped cells.

DETAILED DESCRIPTION

*P. larvae* (previously classified as *Bacillus larvae*) is a pathogen of the larval honeybee (*Apis mellifera* L.), causing a fatal disease called American foulbrood. A bacteriophage of *B. larvae* was first isolated by Smirnova (1953) from decaying larvae of bees killed by American foulbrood. Gochnauer (1955) isolated a phage from a lysogenic culture of *P. larvae*. Gochnauer's phage differed from the phage isolated by Smirnova (1954) in their ability to pass through asbestos filters, heat stability, and plaque morphology (Gochnauer, 1970). In addition to describing certain properties of the phage isolated from the strain now known as *B. larvae* NRRL B-3553 (Gochnauer and L'Arrivee, 1969), Gochnauer (1970) presented evidence suggesting that other phages were present in other strains of *B. larvae*. This conclusion was drawn from sensitivity tests using culture filtrates from different *B. larvae* cultures and lawns of many different strains. No efforts were made to isolate the different phages. Gochnauer (1970) was unable to concentrate or purify the phage from strain B-3553, and, hence, was unable to observe the morphology or analyze the nucleic acid component of this phage.

A phage specific for *B. larvae* was isolated from a soil sample from a park in Plodiv, Bulgaria (Popova et al., 1976; Valerianov et al., 1976). This phage, named L3, lysed 10 of 15 strains of *B. larvae* tested. It did not lyse *B. cereus* or *B. anthracis*. A phage, termed BLA, was isolated in Czechoslovakia from several *B. larvae* strains obtained from combs containing bee larvae killed by American foulbrood (Drobnikova and Ludvik, 1982). All of the phage preparations from different cultures were considered to be identical, based on the sole criterion of their appearance in electron micrographs.

Previous studies were conducted to purify and characterize the phage isolated by Gochnauer (1955) from *B. larvae* NRRL B-3553. Gochnauer and L'Arrivee (1969) reported that when a culture filtrate of strain B-3553 was plated on lawns of *B. larvae* NRRL B-3553, both large plaques (2 to 3 mm) and pinpoint plaques appeared. Subculturing of both resulted in a uniform plaque size (1 to 2 mm), however, and the authors concluded that both plaque types were caused by the same phage. Other evidence, however, indicated that strain B-3553 contains two distinct phages.

As described herein, *P. larvae* in honeybees can be lysed by introducing phage into a bee hive, such that the phage can physically associate with and lyse the *P. larvae*. One phage described herein infected all eight environmental *P. larvae* strains tested, as well as two newly isolated *P. larvae* (wild) strains. This phage is from an amateur beekeeper's hives in North Las Vegas at Gilcrease Orchard. None of the phages infected other bacteria or higher organisms. Thus, although the word "virus" can have a negative connotation, in this case, viruses are a potential means to control the bacterium and, thereby, treat *P. larvae* infection.

Using phage therapy for treating and/or preventing *P. larvae* infections in honeybees can have several advantages. For example, phages generally have specific targets, and thus may have a low likelihood of affecting eukaryotic host cells and natural microbiota of the eukaryotic host. In addition, only small doses may be needed, and they may be readily provided on polysaccharide biofilms, for example. Further, phages are naturally occurring.

A first research goal of the work described herein was to characterize newly isolated environmental and lysogenic phages, to determine whether one phage was isolated multiple times or if multiple different phages were isolated. Either of these cases has advantages for treating AFB. For example, if the same phage was isolated 31 times, then it is widespread and has wide potential for treatment. If more than one phage was isolated, then a cocktail of the multiple types could be even more effective as a treatment.

A second goal of the research described herein was to determine if phages can prevent AFB infection in early stage larvae. It is believed that this approach to the treatment of AFB is environmentally and biologically safe. In some embodiments, this document provides methods method for deterring a first strain of *P. larvae* that is not *P. larvae* 2605 by providing to an environment of a bee hive infected with the first strain of *P. larvae* an isolated lytic phage that lyses *P. larvae* 2605 and deters productive replication of *P. larvae* 2605. In some embodiments, this document provides methods for deterring a first strain of *P. larvae* that is not *P. larvae* 2605 by providing to an environment of a bee hive infected with the first strain of *P. larvae* a lysing phage that lyses with *P. larvae* 2605 and at least two other strains of *P. larvae* selected from the group consisting of A TCC Numbers 9545, 25367, 25368, 25747, 25748, and 49843. The lysing phage may be provided by delivering food for bees that contains the lysing phage to the bee hive. The lysing phage may be provided by delivering food for bees that contains the lysing phage to the bee hive and the first strain of *P. larvae* that is not *P. larvae* 2605 deters productive replication of *P. larvae* 2605 and the at least two other strains of *P. larvae*.

One general description of the mechanism of treatment of the AFB is as follows. A bacteriophage is a virus that destroys bacteria by lysis. Several varieties exist, and each typically attacks only one species/strain of bacteria. Infecting phage attach themselves to the cell wall of the bacterium and inject their genetic material (e.g., a charge of DNA) into the cytoplasm of the bacterium. The DNA/RNA carries the genetic code of the virus, and rapid multiplication of the virus takes place inside the bacterium. The growing viruses act as parasites, using the metabolism of the bacterial cell for growth and development. Eventually the bacterial cell bursts, releasing many more viruses capable of destroying similar bacteria.

With some bacteria, notably those of the Streptococcus family, infection by certain phages can dramatically alter pathogenicity, converting previously innocuous microbes into deadly pathogenic strains. The so-called "flesh-eating" bacteria have incorporated into the chromosomes a bacteriophage that brings with it toxic genes. Another example is the common inhabitant of human nasal passages, *Corynebacterium diphtheria*. These are relatively harmless bacteria. Just like every other living thing, bacteria have viruses that infect them. Bacterial viruses are called bacteriophage, or just "phage." Phages have two means by which to infect bacterial cells. One is lysogeny, in which the phage DNA incorporates into the chromosome of the bacterium and becomes dormant for many generations. At least one environmental inducer is required to cause the phage DNA to excise from the bacterial chromosome and establish the second type of infection, the lytic phase. In this phase, the bacterium is transformed into a phage-making factory. Hundreds of phages are produced and the bacterial cell is lysed to release them. The released phage then find another host bacterium, and the process repeats.

Until the work described herein was conducted, the only phage to be discovered and characterized were lysogenic phage that had been induced to become lytic. Only one report, from the 1960s, described an environmental presence for phages that infect *P. larvae*.

The work described herein was conducted to determine if native lytic *P. larvae* phages might exist in nature, and if any such phages would be highly infective to strains of *P. larvae*. As discussed herein, the answer to both of these questions is yes. Well over 130 samples were tested, some related to bees and some not. From these samples, 31 were found to be positive for phages. The samples were from all over the United States, and they showed patterns of infection with eight strains of *P. larvae* obtained from the American Type Culture Collection (ATCC).

FIG. 2 is a graphic of the replication of a bacteriophage during the lytic cycle. Before viral infection, the cell is involved in replication of its own DNA and transcription and translation of its own genetic information to carry out biosynthesis, growth and cell division. After infection, the viral DNA takes over the machinery of the host cell and uses it to produce the nucleic acids and proteins needed for production of new virus particles. Viral DNA replaces the host cell DNA as a template for both replication (to produce more viral DNA) and transcription (to produce viral mRNA). Viral mRNAs are then translated, using host cell ribosomes, tRNAs and amino acids, into viral proteins such as the coat or tail proteins. The process of DNA replication, synthesis of proteins, and viral assembly is a carefully coordinated and timed event. The overall process of lytic infection is diagrammed in the figure; discussion of the specific steps follows.

FIG. 3 is a graphic representation of a more complete stage of replication during the lytic cycle. Many bacteriophage that have been studied infect *E. coli*. The first step in the replication of the phage in its host cell is called adsorption. The phage particle undergoes a chance collision at a chemically complementary site receptors on the bacterial surface, and then adheres to that site by means of its tail fibers.

Following adsorption, the phage injects its DNA (and rarely RNA) into the bacterial cell. The tail sheath contracts and the core is driven through the wall to the membrane. This process is called penetration, and it may be both mechanical and enzymatic. Phage T4 packages a bit of lysozyme in the base of its tail from a previous infection and then uses the lysozyme to degrade a portion of the bacterial cell wall for insertion of the tail core. The DNA is injected into the periplasm of the bacterium; generally it is not known how the DNA penetrates the membrane.

Immediately after injection of the viral DNA, the process called "synthesis of early proteins" is initiated. This refers to the transcription and translation of a section of the phage DNA to make a set of proteins that are needed to replicate the phage DNA. Among the early proteins produced are a repair enzyme to repair the hole in the bacterial cell wall, a DNAase enzyme that degrades the host DNA into precursors of phage DNA, and a virus specific DNA polymerase that will copy and replicate phage DNA. During this period, the cell's energy-generating and protein-synthesizing abilities are maintained, but they are subverted by the virus. The result is the synthesis of several copies of the phage DNA.

The next step is the synthesis of late proteins. Each of the several replicated copies of the phage DNA can be used for transcription and translation of a second set of proteins called the late proteins. The late proteins are mainly structural proteins that make up the capsomeres and the various components of the head and tail assembly. Lysozyme is another late protein that will be packaged in the tail of the phage and used to escape from the host cell during the last step of the replication process.

The replication of phage parts is followed by an assembly process. The proteins that make up the capsomeres assemble themselves into the heads and "reel in" a copy of the phage DNA. The tail and accessory structures assemble and incorporate a bit of lysozyme in the tail plate. The viruses arrange their escape from the host cell during the assembly process.

While the viruses are assembling, lysozyme is being produced as a late viral protein. Some of this lysozyme is used to escape from the host cell by lysing the cell wall peptidoglycan from the inside. This accomplishes the release of the mature viruses, which spread to nearby cells, infect them, and complete additional cycles. The life cycle of a T-phage takes about 25-35 minutes to complete. Because the host cells are ultimately killed by lysis, this type of viral infection is referred to as lytic infection.

Figure 4:
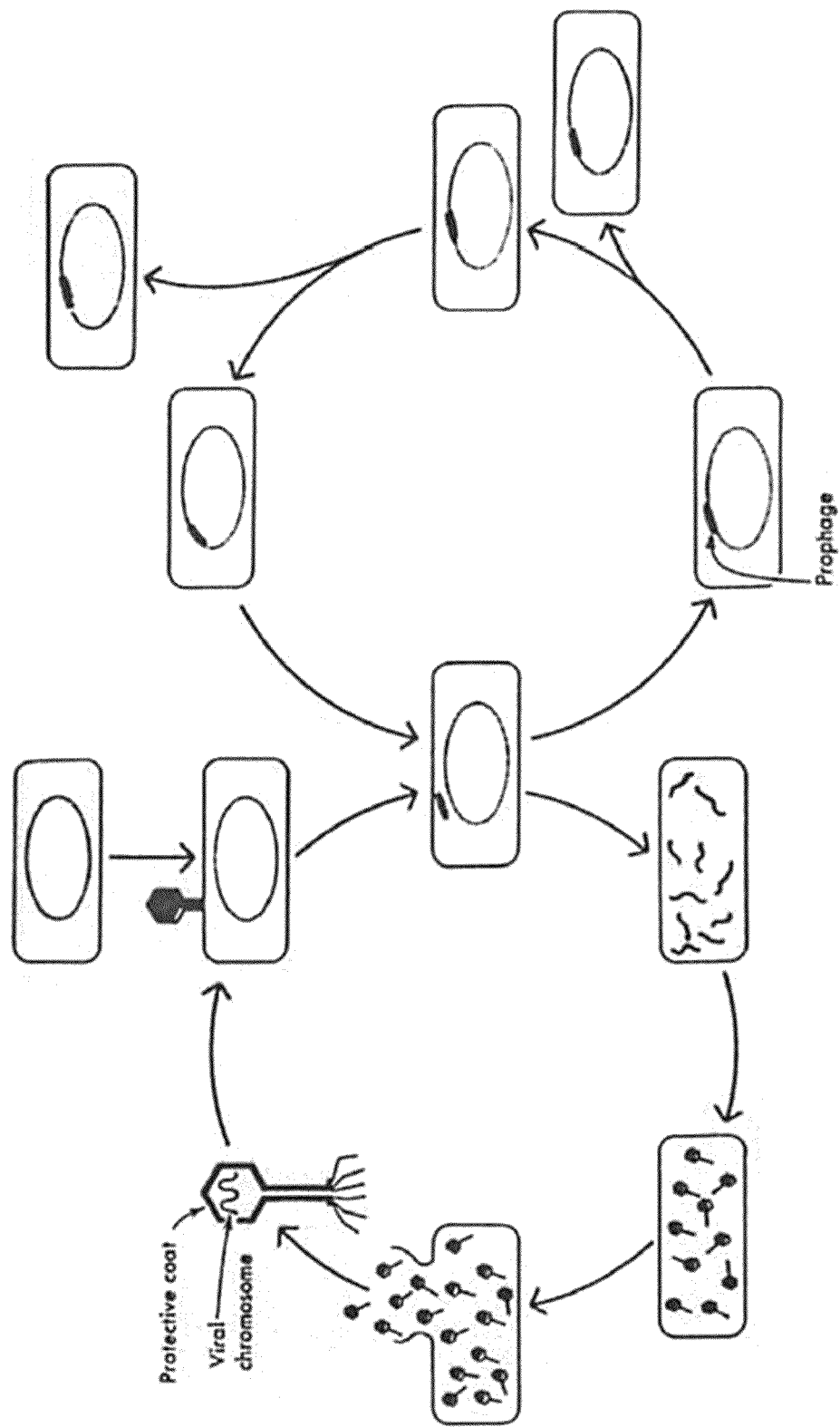

FIG. 4 is a graphic representation of a complete lysogenic cycle. Lysogenic (or "temperate") infection rarely results in lysis of the bacterial host cell. Lysogenic viruses (e.g., lambda, which infects *E. coli*) have a different strategy than lytic viruses for their replication. After penetration, the virus DNA integrates into a specific section of the bacterial chromosome and is replicated every time the cell duplicates its chromosomal DNA during normal cell division. Such phage DNA is called "prophage," and the host bacteria are said to be lysogenized. In the prophage state, all the phage genes except one are repressed, and none of the usual early proteins or structural proteins are produced.

The one phage gene that is expressed is an important one, because it codes for the synthesis of a repressor molecule that prevents the synthesis of phage enzymes and proteins required for the lytic cycle. If the synthesis of the repressor molecule stops or if the repressor becomes inactivated, another enzyme encoded by the prophage is synthesized, and the enzyme then excises the viral DNA from the bacterial chromosome. The excised DNA (the phage genome) can then behave like a lytic virus to produce new viral particles and eventually lyse the host cell. This spontaneous derepression is a rare event, occurring about one in 10,000 divisions of a lysogenic bacterium, but it assures that new phage are formed that can proceed to infect other cells.

It can be difficult to recognize lysogenic bacteria, because lysogenic and nonlysogenic cells appear identical. In a few situations, however, the prophage supplies genetic information such that the lysogenic bacteria exhibit a new characteristic (new phenotype) that is not displayed by the nonlysogenic cell. This phenomenon is called lysogenic conversion.

In lytic systems, a protein known as holin is responsible for forming a pore in the cell membrane, such that lysin proteins can target bonds in the peptidoglycan of the cell wall that are necessary component for the wall to remain intact. Lysin thus produces holes in the cell wall peptidoglycan, and the cell membrane is externalized after internal pressure forces it through the hole in the cell wall. This leads to rupture of the membrane and loss of intercellular components, causing cell death. External lysin therapy works only on Gram+ cells, however. Gram− cells have an outer membrane covering the peptidoglycan cell wall, so lysin is not able to form a hole without a holin to degrade the cell membrane.

Figure 5:
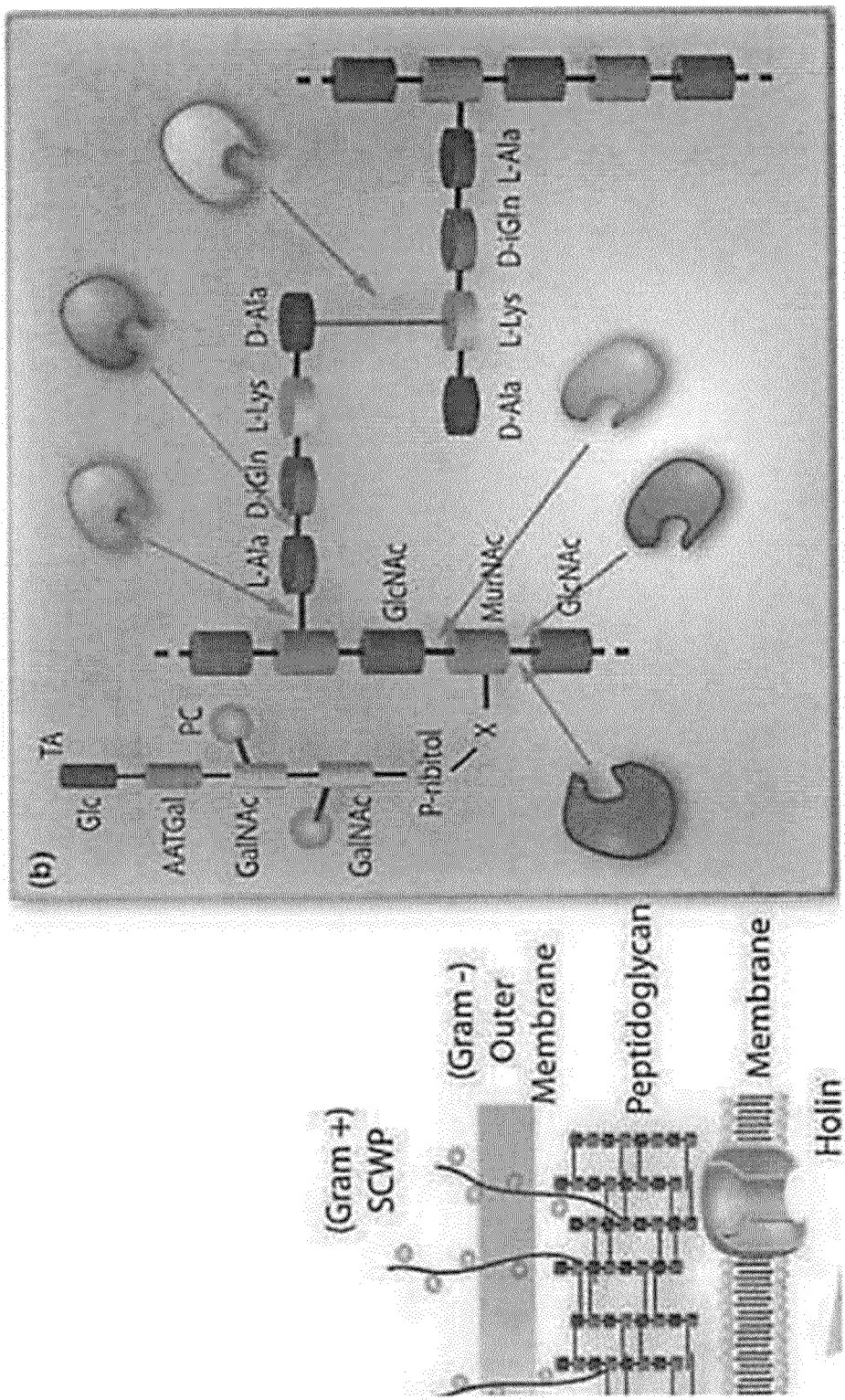
Figure 6:
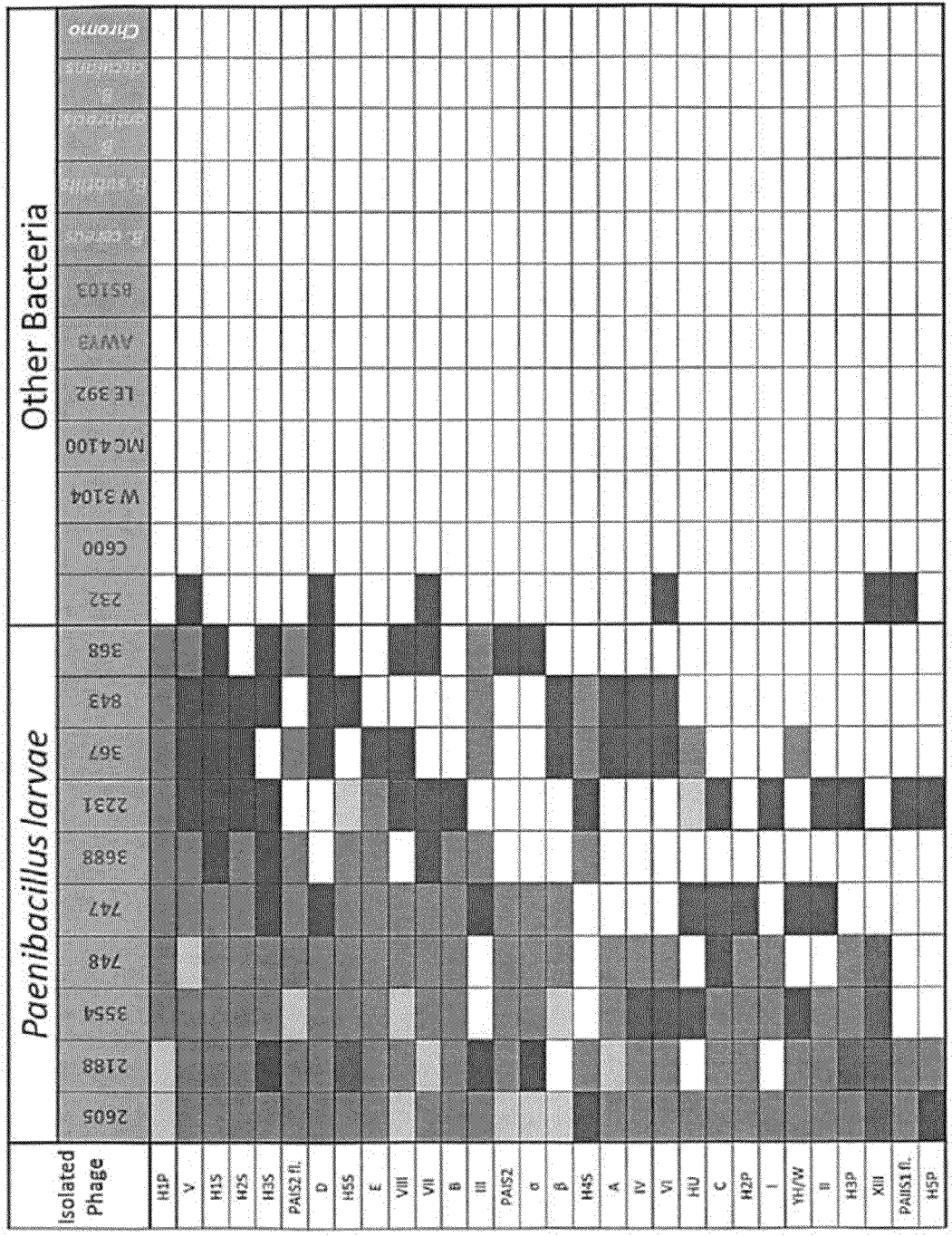

FIG. 5 shows a graphic representation of a phage lysin system. When a phage is inside a bacterial cell, it needs to produce holins in order for the lysins to reach the cell wall peptidoglycan (left panel). Holins are small membrane proteins that accumulate in the membrane until, at a specific time that is "programmed" into the holin gene, the membrane suddenly becomes permeabilized to the fully folded endolysin. Destruction of the murein bacterial cell wall and bursting of the cell are immediate sequelae. Holins control the length of the infective cycle for lytic phages, and thus are subject to intense evolutionary pressure to achieve lysis at an optimal time. Holins are regulated protein inhibitors of several different kinds Each of the different circled enzymes in FIG. 5 fright panel) represents a different type of lysin that is specific to a different bond within the peptidoglycan. Cleavage of any one of these bonds can degrade the cell wall. When lysin is introduced from the external environment, a holin is not required but is optional.

This document provides methods for deterring (e.g., preventing or reducing productive replication of) *P. larvae*, such as strains of *P. larvae* that are not *P. larvae* 2605. The methods provided herein can include, for example, providing to an environment of a bee hive infected with *P. larvae* an isolated lytic phage that can lyse *P. larvae* 2605 and deter productive replication of *P. larvae* 2605. In some embodiments, the phage can be contained within a composition, and can be provided directly to bee larvae (e.g., in larvae food, or in another composition that larvae can ingest) or can be applied to the bee hive or portions thereof. Lysing of the *P. larvae* can cause a hole in the peptidoglycan of the cell wall, and the cell membrane of the *P. larvae* can be is externalized due to internal pressure that forces the membrane through the hole in the cell wall, leading to rupture of the cell membrane and loss of intercellular components. Rupture of the cell membrane can lead to death of the first strain of *P. larvae.*

In some embodiments, the methods provided herein can include providing to an environment of a bee hive infected with *P. larvae* one or more lysing phages that, individually or in combination, are capable of lysing *P. larvae* 2605 and at least two other strains of *P. larvae* (e.g., two or more strains represented by ATCC Numbers 9545, 25367, 25368, 25747, 25748, and 49843). That is, one phage may be capable of lysing more than one strain of *P. larvae*, or multiple (e.g., 2, 3, 4, 5, 6, 7, 8, 9, 10, or more than 10) phage isolates in combination (e.g., as a cocktail) may be capable of lysing more than one strain of *P. larvae.*

The methods provided herein also can be used to treat a *P. larvae* infection in a honeybee, or to reduce the risk of *P. larvae* infection in a honeybee. In some embodiments, the methods provided herein can include administering to a honeybee a composition containing a lytic phage that is capable of lysing *P. larvae* 2605 and deterring productive replication of *P. larvae* 2605, where the honeybee is not infected by *P. larvae* 2605. In some embodiments, a composition can contain one or more lytic phages that are capable of lysing *P. larvae* 2605 and at least two other strains of *P. larvae* (e.g., strains selected from the group consisting of ATCC Numbers 9545, 25367, 25368, 25747, 25748, and 49843). Thus, a composition may contain one phage that is capable of lysing more than one strain of *P. larvae*, or multiple (e.g., 2, 3, 4, 5, 6, 7, 8, 9, 10, or more than 10) phage isolates that, in combination, are capable of lysing more than one strain of *P. larvae*.

Any suitable number of phage can be administered. For example, a method can include administering at least $10^3$ to at least $10^{10}$ (e.g., at least $10^3$, at least $10^4$, at least $10^5$, at least $10^6$, at least $10^7$, at least $10^8$, at least $10^9$, or at least $10^{10}$) or more plaque-forming units (PFU) to the environment of a bee hive.

Methods of obtaining and testing bacterial samples for the presence of phage are known in the art. As described in the Examples below, for example, several strains of *P. larvae* were obtained from ATCC, and each was tested for lysogeny. Each strain was allowed to grow for 24 hours in a flask, then centrifuged to pellet the bacterial cells, and filtered to remove remaining cells while allowing potential phage to pass through. The filtrate was then enriched with the universal host, *P. larvae* 2605, to allow possible phage to propagate. No induction method was needed; when the strains were grown, phage were successfully isolated from the spent medium. As described, five of eight strains tested had lysogenic phage present (isolated phage strains A, B, C, D, and E of Table 1).

To isolate phage from environmental samples, external phage particles from previous lytic cycles were used to infect *P. larvae* 2605. These were the first phages for *Paenibacillus* isolated from environmental samples. Samples were shaken in a buffer for 4 hours, and then centrifuged and filtered. Filtrates were then enriched with *P. larvae* 2605 to allow potential phage to propagate. All cultures were incubated at 37° C., as 35-37° C. is the internal temperature of the hive. Cultures with the environmental samples were allowed to grow for 24 hours, then spun in a centrifuge and filtered to remove bacterial cells. The filtrates were used for initial screenings. *P. larvae* 2605 and putative virus filtrates were combined in a melted soft agar overlay, then poured on a nutrient containing agar and allowed to solidify. Soft agar overlays contained 0.95% agar, 1% yeast extract and same medium as underlying plates (modified Brain Heart Infusion broth; mBHI). Additional salts ($CaCl_2$ and $MgCl_2$) were added to enable phage to attach to receptors of bacterial cells. The final concentration of agar when viruses and bacteria were added was 0.6%. Viruses capable of lysing *P. larvae* were indicated by the formation of small holes (plaques) in the lawn of growth. Single plaques were picked with sterile wooden sticks and inoculated into fresh media, then enriched with *P. larvae*. This was done several times to ensure purity before amplifying the phage to increase titers. Titers can be determined by diluting the phage lysate used in the overlay procedure and counting the plaques, then calculating the number of phage that are present in a specific volume (1 ml).

Any of a number of types of samples can be tested for phage that may be useful in treating *P. larvae* infection. These include, without limitation, garden soils, pig farm soil/manure, xeriscape garden soil, desert soils (creek bank, under sagebrush, near volcanic rock, in wash/creosote), leaves, crushed flowers (rose, cilantro), soil under bee-frequented bushes, compost, crushed bee extract, soils under hive, honey (UNLV hive honey, Oregon honey, Iowa honey), hive components (wax, propilis, royal jelly, dead larvae, pollen), Gilcrease Orchard samples, scales of diseased honeybee larvae, cultures of *P. larvae*, Las Vegas wash water samples, Burt's Bees products, and various lip balms/cosmetics.

Table 1 lists ATCC numbers and internal designations for various *P. larvae* strains. Subspecies larvae or *pulvifaciens* are strains that formerly had subspecies designations but now have been determined to be the same with no subspecies designations. It has been noted that the previous subspecies *pulvifaciens* were bright orange, and one can see that the phage now isolated on a larvae strain (2605, also referenced as ATCC 9545 or ATCC 9545/NRRL 2605) infect the same subspecies better than the *pulvifaciens* strains. The larvae strains are more infectious and lethal as well.

TABLE 1

| ATCC # | NRRL # | Other # | Our # | Subspecies |
|---|---|---|---|---|
| 9545 | 2605 | | 2605 | *larvae* |
| 25367 | | 24026 | 367 | *pulvifaciens* |
| 25368 | | 24027 | 368 | *pulvifaciens* |
| 25747 | | | 747 | *larvae* |
| 25748 | | | 748 | *larvae* |
| 49843 | 3685 | | 843 | *pulvifaciens* |

ATCC numbers are not provided for internal designations of 3688 (which is *pulvifaciens*) and 3554 (which is larvae).

Table 2 is a representative listing samples from which phage were obtained. Positive results were obtained 30 times from 130 samples tested. The left column of Table 2 shows the name of each phage isolate, and the right column contains a description of source. Thus, phage capable of infecting *P. larvae* were isolated from the environment.

TABLE 2

| Virus abbreviation | Source |
|---|---|
| σ | Burt's Bees Honey and Grape seed Oil Hand Cream (Beeswax, honey) |
| IV | Burt's Bees lip balm from park (regular) |
| β | Burt's Bees Radiance Body Wash (Royal jelly) |
| V | Carmex lip balm |
| VI | Environmental sample |
| VII | Environmental sample |
| I | Garden soil - Summerlin |
| II | Garden soil - Summerlin |
| HU | Hive sample from Iowa |
| YH/W | Hive sample from Iowa - honey and wax |
| C | Internal phage from *P. larvae* 367 (25367) |
| B | Internal phage from *P. larvae* 368 (25368) |
| A | Internal phage from *P. larvae* 3685 |
| D | Internal phage from *P. larvae* 747 (25747) |
| E | Internal phage from *P. larvae* 843 (49843) |
| VIII | Norway lip balm from Finn Ware at Scandinavian Festival in Astoria, OR |
| H1P | Propilis from bee hive - Gilcrease Orchards |
| H2P | Propilis from bee hive - Gilcrease Orchards |
| H3P | Propilis from bee hive - Gilcrease Orchards |
| H5P | Propilis from bee hive - Gilcrease Orchards |
| XIII | Scale from infected hive |
| H1S | Soil underneath bee hive - Gilcrease Orchard |
| H2S | Soil underneath bee hive - Gilcrease Orchard |
| H3S | Soil underneath bee hive - Gilcrease Orchard |
| H4S | Soil underneath bee hive - Gilcrease Orchard |
| H5S | Soil underneath bee hive - Gilcrease Orchard |
| PAIIS1 fl. | Soil underneath bee hive - Pennsylvania |
| PAIS2 fl. | Soil underneath bee hive - Pennsylvania |
| III | Soil underneath bee hive - UNLV |

The invention will be further described in the following examples, which do not limit the scope of the invention described in the claims.

EXAMPLES

Example 1

Sources of Bacteriophage Capable of Infecting *P. larvae*

Materials and Methods

Growth of Bacterial Strains:

The following strains of *Paenibacillus larvae* were used: NRRL B-2605, NRRL B-3554, NRRL B-3650, ATCC-25748, ATCC-25747, ATCC-49843, ATCC-25367, ATCC-25368, and ATCC-3688. In addition, two naturally occurring cultures isolated from infected hives were used: 2188 and 2231. Bacteria were grown for phage propagation under the same conditions as described by Alvarado et al. (submitted for publication, 2014) in a modification of BHI broth.

Environmental Sampling Technique:

Environmental samples were obtained using alcohol flame-sterilized metal spoons and placed into sterile Whirlpac bags. Samples also were collected remotely by individuals in other locations using the same sampling methods. After collection, samples were stored at 4° C.

Sample Sources:

Lysogenic phages were screened from all 11 strains of *P. larvae*. Procedures adapted from Dingman et al. (*J Gen Virol* 65:1101-1105, 1984) were used to obtain lysogenic bacteriophages. No special methods were needed to induce prophage as suggested by Mayer et al. (*Appl Microbiol* 18:697-698, 1969) from *P. larvae* strains, because sufficient numbers of phage became lytic during the growth of their host bacteria. Cells were grown as described by Alvarado et al. (supra). The presence of phages was determined by plaque formation on a bacterial lawn of *P. larvae* 2605 using a soft agar overlay method (Hurst and Reynolds, "Sampling viruses from soil," In: *Manual of environmental microbiology*, Ed. Hurst, Crawford, and McInerney, 2nd ed., American Society for Microbiology Press, Washington, D.C., pp. 527-534, 2002).

Environmental phages were obtained from screening various soil samples, air samples, cosmetics containing materials derived from beehives, and materials directly from beehives such as royal jelly, wax, propolis, and honey. These samples were obtained from locations in Nevada, Washington, New Mexico, Oregon, Pennsylvania, New York, and Iowa. Cosmetic sample sources, obtained from traditional retail settings, included various brands of lip balms with or without honeybee derived additions. A combined total of 157 samples were screened. Methods for preparing environmental samples are fully described in Alvarado et al. (supra). Filtrates free from bacterial contamination were used as the starting material for enrichment of lytic bacteriophages capable of lysing *P. larvae*.

Phage Enrichment, Screening and Isolation:

Bacteriophage enrichment was achieved using standard techniques as described by Hurst and Reynolds (supra). To enrich for *P. larvae*-specific bacteriophages, the *P. larvae* host strain 2605 was used. This strain was utilized because it was phage-free after testing for lysogeny using the technique described above, and it was previously used as a host strain in phage research (Woodrow, *J Econ Entomol,* 35:892-895, 1942). Details of phage enrichment, screening and isolation are fully described in Alvarado et al. (supra).

Amplification of Phages and Determination of Phage Titers:

Phage titers were determined using the soft agar overlay technique described above. Standard methods using two plates from a dilution with resulting plaque numbers ranging from 30-300 were selected to ensure statistical accuracy. Plaques from the chosen dilution were then counted, counts were averaged, and titers were calculated based on the dilution (Miller, "Methods for enumeration and characterization of bacteriophages from environmental samples," In: *Techniques in Microbial Ecology*, Ed. Burlage, Atlas, Stahl, Geesey, and Sayler, Oxford University Press, pp. 218-233, 1998).

Soft Agar Overlay Spot Test:

After amplification, each lysate was tested to determine its ability to form plaques on each *P. larvae* strain and other bacterial species including: *Paenibacillus* sp. isolated from a hive, *Paenibacillus polymyxa, Paenibacillus alvei, Paenibacillus lentimorbus, Paenibacillus popillae, Escherichia coli, Shigella flexneri, Bacillus cereus, Bacillus subtilis, Bacillus anthracis, Bacillus circulans*, and *Chromohalobacter* sp. A 1 ml aliquot of sterile broth and 1 ml of an overnight culture of a single bacterial strain were added to a tube of melted GmBHI agar (0.95%) containing 37 g BHI (Difco), 4 g dextrose (Sigma), and 1 mM each of $CaCl_2$ and $MgCl_2$ in 1 L $ddH_2O$. This mixture was then poured over a GmBHI agar (1.5%) plate to create a bacterial lawn. Plates were divided into quadrants, with 10 μl of a single lysate spotted onto the surface of each quadrant creating quadruplicate testing. The ability to lyse a *P. larvae* bacterial strain was measured by clearing. Each phage isolate was tested against each bacterial strain using a scale from no evidence of lysis to complete clearing (Table 6). All host range results were recorded by the same individual for consistency. The phages with the broadest host range and highest intensity of lysis were of interest as a potential treatment for hives infected with AFB. Therefore, these phages were selected for further characterization. An exception was made for a pair of phages that had the same host range pattern but were isolated from very different sources. Determination of the similarity within these pairs was of interest because they might give some indication of geographic distribution.

EM Grid Preparation:

To prepare a highly concentrated phage lysate, 20 identical soft agar overlay plates were prepared by mixing *P. larvae* strain 2605 with sufficient phage to result in complete lysis of bacterial cells. Plates were prepared with GmBHI (0.4% Difco glucose was added to mBHI) containing 1.5% agarose, and overlays were made of GmBHI with 0.95% agarose. These plates were incubated overnight at 37° C.

For agarose removal and filtration, 5 ml of PBS pH 7.1 was added to the surface of each plate and was allowed to sit for 20 minutes. The top layer of the agarose overlay was then scraped off using a sterile pipette tip, making sure the underlying medium was not disturbed. The scraped agarose plus PBS was collected and transferred to a funnel lined with four layers of cheesecloth to remove the agarose particles. The resulting liquid was then filtered through a sterile 0.2 μm filter (VWR or Fisher) using vacuum filtration to remove bacterial cells.

To concentrate phages, the filtrate was distributed into 50 ml polysulfone centrifuge tubes (VWR) and phages were pelleted by centrifugation for 15 hours at 4° C. and 18,000×g (Beckman J2-HS). The supernatant was removed and the centrifuge tubes were briefly inverted, being careful to prevent the phage pellet from completely drying. The phage pellet was gently resuspended in 1.0 ml of phage buffer, pH 7.5 with a composition of 10 mM Tris-HCl, 10 mM $MgSO_4$, and 68 mM NaCl (Dr. Malcom Zellars), using a cut-off 1 ml sterile, disposable pipette tip, then removed from the centrifuge tube and transferred to a 1.5 ml microcentrifuge tube. The starting volume of approximately 100 ml was concentrated to a final volume of 3 ml. This concentrated phage preparation was used to prepare grids for TEM imaging.

Using a carbon-coated copper grid (Ted Pella), 10 μl of each concentrated preparation was placed onto the carbon surface and allowed to sit for 10 min prior to wicking away the liquid with Whatman 541 paper wedges. The grid was rinsed (2×) for 2 min with sterile filtered $ddH_2O$, and the liquid was wicked away. The grid was stained for 2 min with 10 μl 2% uranyl acetate (pH 4.4), and the stain was wicked away before allowing the grid to air dry. Grids were sent to the CAMCOR facilities at the University of Oregon for imaging.

Results

Composition of Isolated Phages and Proportion of Phage-Containing Samples from Each Category:

A combined total of 157 *P. larvae* strains, environmental samples, and commercial samples were screened for bacteriophages capable of lysing *P. larvae* 2605. Of the 157 samples, 32 were found to contain lytic viral particles (Table 3). Table 4 displays the source and current designation of the 32 isolates. There was no apparent correlation between the source from which an isolate was obtained and the effectiveness of the phage against strains of *P. larvae*. The percentage of the total samples screened in each category was as follows: 31% soil underneath beehives, 22% internal hive samples, 19% lysogenic phage, 16% cosmetics, and 12% other environmental sources. Because the number of samples in each category was not equivalent, the actual proportion of positive samples within a category was different from that of proportion of total samples tested. For example, although 19% of the total phages found were lysogenic, of the 11 bacterial strains tested, over half (54.5%) of the samples contained phages. Likewise, only 16% of the total phages were from cosmetics, but out of the 22 cosmetic samples screened, 5 yielded phage (22.7%) (Table 3).

TABLE 3

Proportion of samples found to contain *P. larvae* phage from each category

| Category | Samples Screened | Positive Phage Isolate Samples (#) | Samples Containing Phage (%) |
| --- | --- | --- | --- |
| Lysogenic Phage | 11 | 6 | 54.5 |
| Cosmetics | 22 | 5 | 22.7 |

TABLE 3-continued

Proportion of samples found to contain *P. larvae* phage from each category

| Category | Samples Screened | Positive Phage Isolate Samples (#) | Samples Containing Phage (%) |
| --- | --- | --- | --- |
| Soil Underneath Beehives | 53 | 10 | 18.8 |
| Hive Samples | 44 | 7 | 15.9 |
| Other Environmental Samples | 27 | 4 | 14.8 |

TABLE 4

Source descriptions and designations of 32 phage isolates

| Category | Source | Phage Designation |
| --- | --- | --- |
| Cosmetics | Hand cream (contains beeswax and honey) | σ |
| | Body wash (contains royal jelly) | β |
| | Lip balm #1 | IV |
| | Lip balm #2 | V |
| | Lip balm #3 | VIII |
| Hive Samples | Scale from infected hive | XIII |
| | Hive sample from Iowa | HU |
| | Hive sample from Iowa (honey and wax) | YH/W |
| | Propolis from beehive - Gilcrease Orchards, Nevada | H1P |
| | Propolis from beehive - Gilcrease Orchards, Nevada | H2P |
| | Propolis from beehive - Gilcrease Orchards, Nevada | H3P |
| | Propolis from beehive - Gilcrease Orchards, Nevada | H5P |
| Soil Underneath Beehives | Soil underneath beehive - Gilcrease Orchards, Nevada | H1S |
| | Soil underneath beehive - Gilcrease Orchards, Nevada | H2S |
| | Soil underneath beehive - Gilcrease Orchards, Nevada | H3S |
| | Soil underneath beehive - Gilcrease Orchards, Nevada | H4S |
| | Soil underneath beehive - Gilcrease Orchards, Nevada | H5S |
| | Soil underneath beehive - Pennsylvania | PAIIS1 fl |
| | Soil underneath beehive - Pennsylvania | PAIS2 fl |
| | Soil underneath beehive - Pennsylvania | PAIS2 med. cl. |
| | Soil underneath beehive - UNLV, Nevada | III |
| | Soil underneath beehive - Washington | WA |
| Other Environmental Samples | Garden soil - Summerlin, Las Vegas, Nevada | I |
| | Garden soil - Summerlin, Las Vegas, Nevada | II |
| | Air sample (gravity plates) - Las Vegas, Nevada | VI |
| | Air sample (gravity plates) - Las Vegas, Nevada | VII |
| Lysogenic Phage | Phage from ATCC-49843 | A |
| | Phage from ATCC-25368 | B |
| | Phage from ATCC-25367 | C |
| | Phage from ATCC-25747 | D |
| | Phage from ATCC-49843 | E |
| | Phage from wild strain 2231 | F |

Plaque Morphology:

Individual phage filtrates produced plaques in soft agar overlays, which were characterized based on size and morphology (Table 5). Plaque sizes ranged and were described using set plaque diameters in the following classifications: pinpoint (<0.1 mm), small (0.1 mm-0.5 mm), medium (0.5 mm-1.0 mm), and large (>1.0 mm). Along with size, plaques were classified as either turbid or clear. In one case, a turbid halo surrounded a clear plaque, and this feature was also considered for characterization. Plaque morphologies of the phages were as follows: 4 large, clear; 4 medium, clear; 3 small-medium, clear; 1 small, clear; 1 pinpoint, clear; 1 small, turbid; and 5 pinpoint, turbid. Although there was a distribution of sizes, there were more large, clear plaques than small, clear plaques, and more small, turbid plaques than large, turbid plaques.

TABLE 5

Plaque morphology classification of each phage observed in soft agar overlays

| Phage Designation | Plaque Morphology | |
|---|---|---|
| | Size | Clarity |
| XIII | Large | Clear |
| H1P | Pinpoint | Turbid |
| WA | Medium | Clear |
| H1S | Pinpoint | Clear |
| F | Large | Clear |
| V* | Large | Clear |
| H2S | Small-medium | Clear |
| H3S | Medium | Clear |
| E | Pinpoint | Turbid |
| H5S | Medium | Clear |
| VII | Pinpoint | Turbid |
| D | Large | Clear |
| PA1S2 - fl. | Pinpoint | Turbid |
| B | Pinpoint | Turbid |
| VIII | Small | Turbid |
| PA1S2 - med. cl. | Medium | Clear |
| Sigma | Small | Clear |
| IV | Small-medium | Clear |
| VI | Small-medium | Clear |

*formed plaques with a turbid halo around a clear plaque center

Host Range Distribution:

The host range results were interpreted on a scale from no clearing to complete clearing. Table 6 describes the classifications and FIG. 9 displays representative pictures for comparison. Phages are designated by letters and numbers, corresponding to the source from which they were isolated. The host range of each of the 32 isolated phages on each of 27 different bacterial strains is presented in Table 7. The bacterial species are represented across the top and are ranked from left to right in order of susceptibility to lysis by the 32 phages. The isolated phages are listed on the left side of the table and are ranked from top to bottom in order of the percentage of *P. larvae* strains they are capable of lysing.

TABLE 6

Spot test descriptions observed in the host range experiment.

| Description | Color Code | Result Scale |
|---|---|---|
| No clearing[a] | | - |
| Faint outline where lysate was placed[b] | | +/- |
| Visible clearing[c] | | + |
| Entire area has been lysed but still turbidity within plaque[d] | | ++ |
| Entire area is completely lysed; no turbidity[e] | | +++ |

Figure 9:
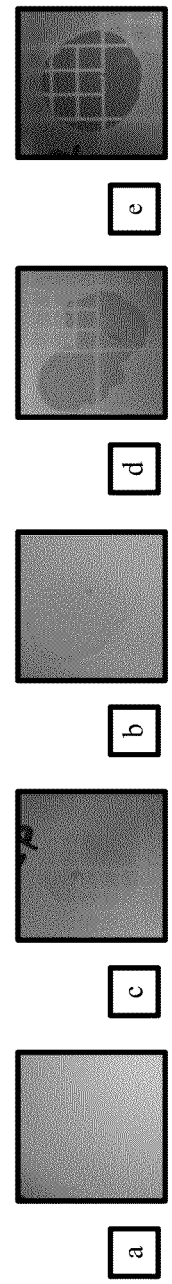

Superscript letters (a-e) correspond to the images presented in FIG. 9.

No bacteria from genera other than *Paenibacillus* showed susceptibility to the isolated phages (Table 7). Even among the *Paenibacillus* species tested, only one species other than *P. larvae* showed any susceptibility, and it was very slight. Although this *Paenibacillus* species was isolated from a hive infected with AFB, PCR amplification of its DNA with *P. larvae* specific-primers revealed that this strain is not *P. larvae* (Piccini et al., *World J Microbiol Biotechnol* 18:761-765, 2002). With an NCBI BLAST search of the PCR products, the organism did not match any other known species of *Paenibacillus*. Only six of the phages were able to very mildly infect this *Paenibacillus* sp.

Three phages, H1P, WA, and H1S, lysed all *P. larvae* strains tested, and F lysed all strains with the exception of its host strain, 2231. In addition, these phages with broad host ranges on *P. larvae* were also highly lytic on multiple strains (+++). One exception was XIII, which was highly lytic only on four *P. larvae* strains. The isolated lysogenic phages were generally not capable of lysing the host strain from which they were isolated, with the exception of D and A, and these only produced +/- results.

Figure 10:
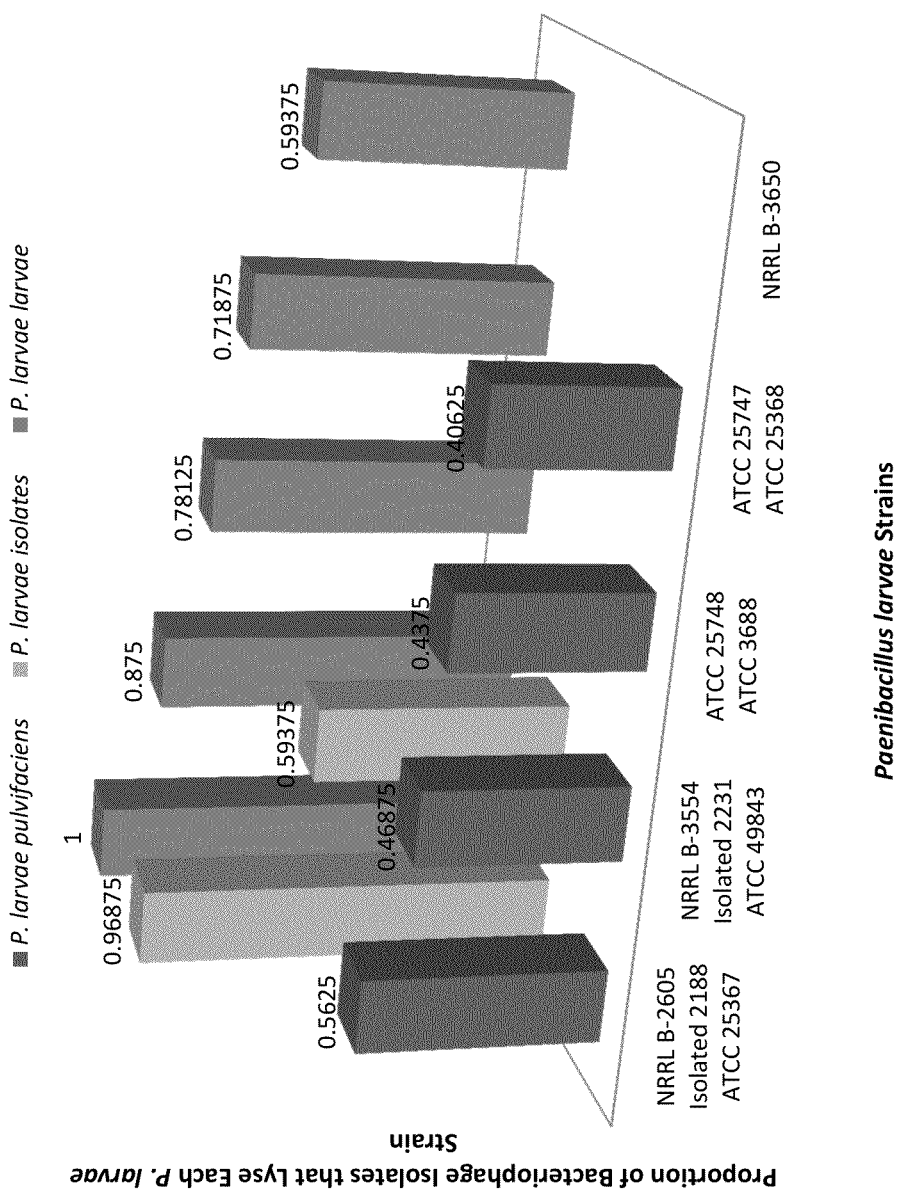

Comparing the Susceptibility of Bacteriophage Lysis on Former *P. Larvae* Subspecies *larvae* and *P. larvae* Subspecies *pulvifaciens*:

As visualized in FIG. 10, there was a distinct difference between the susceptibility of strains formerly designated as *P. larvae* larvae or *P. larvae pulvifaciens* when tested with the 32 newly isolated phages. Sample variances of former *P. larvae pulvifaciens* and former *P. larvae* larvae were 0.0237 and 0.0046, respectively. Welch's t-test determined the values as t=4.169 and degrees of freedom ~5.727. Using these values and a t-distribution table, p=0.0087. Assuming that a statistical significance is inferred when $p \leq 0.01$, there is a significant difference between the means of the proportion of susceptibility that each group of former *P. larvae* subspecies has to the *P. larvae* bacteriophages. Because the two strains that were isolated from an infected hive were not classified under the same former subspecies as the repository strains, they were not included in this calculation.

TABLE 7

Host range of 32 isolated *P. larvae* bacteriophages determined by soft agar overlay spot tests. Results are interpreted on a
scale from no lysis (blank cell) to complete lysis (black cell) as described in Table 6 and visualized in FIG. 9.

| Isolated Phage | *P. larvae* | | | | | | | | | | | *Paenibacillus* sp. | |
| --- | --- | --- | --- | --- | --- | --- | --- | --- | --- | --- | --- | --- | --- |
| | NRRL B-2605 | 2188 Isolate | NRRL B-3554 | ATCC 25748 | ATCC 25747 | NRRL B-3650 | 2231 Isolate | ATCC 25367 | ATCC 49843 | ATCC 3688 | ATCC 25368 | *Paenibacillus* sp. Isolate | *P. polymyxa* |
| H1P | | | | | | | | | | | | | |
| WA | | | | | | | | | | | | | |
| H1S | | | | | | | | | | | | | |
| F | | | | | | | | | | | | | |
| V | | | | | | | | | | | | | |
| H2S | | | | | | | | | | | | | |
| H3S | | | | | | | | | | | | | |
| E | | | | | | | | | | | | | |
| H5S | | | | | | | | | | | | | |
| VII | | | | | | | | | | | | | |
| D | | | | | | | | | | | | | |
| PAIS2 fl. | | | | | | | | | | | | | |
| B | | | | | | | | | | | | | |
| VIII | | | | | | | | | | | | | |
| PAIS2 | | | | | | | | | | | | | |
| σ | | | | | | | | | | | | | |
| A | | | | | | | | | | | | | |
| III | | | | | | | | | | | | | |
| HU | | | | | | | | | | | | | |
| IV | | | | | | | | | | | | | |
| VI | | | | | | | | | | | | | |
| I | | | | | | | | | | | | | |
| β | | | | | | | | | | | | | |
| H4S | | | | | | | | | | | | | |
| C | | | | | | | | | | | | | |
| XIII | | | | | | | | | | | | | |
| H2P | | | | | | | | | | | | | |
| H3P | | | | | | | | | | | | | |
| YH/W | | | | | | | | | | | | | |
| II | | | | | | | | | | | | | |
| PAIIS1 fl. | | | | | | | | | | | | | |
| H5P | | | | | | | | | | | | | |

TABLE 7-continued

Host range of 32 isolated *P. larvae* bacteriophages determined by soft agar overlay spot tests. Results are interpreted on a scale from no lysis (blank cell) to complete lysis (black cell) as described in Table 6 and visualized in FIG. 9.

| Isolated Phage | *Paenibacillus* sp. | | | Other Genera of Bacteria | | | | | | | | | |
|---|---|---|---|---|---|---|---|---|---|---|---|---|---|
| | *P. alvei* | *P. lentimortbus* | *P. popilliae* | *E. coli* C600 | *E. coli* W 3104 | *E. coli* MC 4100 | *E. coli* LE 392 | *S. flexneri* AWY3 | *S. flexneri* BS103 | *B. cereus* | *B. subtilis* | *B. anthracis* | *B. circulans* | *Chromohalobacter* sp. |
| H1P | | | | | | | | | | | | | | |
| WA | | | | | | | | | | | | | | |
| H1S | | | | | | | | | | | | | | |
| F | | | | | | | | | | | | | | |
| V | | | | | | | | | | | | | | |
| H2S | | | | | | | | | | | | | | |
| H3S | | | | | | | | | | | | | | |
| E | | | | | | | | | | | | | | |
| H5S | | | | | | | | | | | | | | |
| VII | | | | | | | | | | | | | | |
| D | | | | | | | | | | | | | | |
| PAIS2 fl. | | | | | | | | | | | | | | |
| B | | | | | | | | | | | | | | |
| VIII | | | | | | | | | | | | | | |
| PAIS2 | | | | | | | | | | | | | | |
| σ | | | | | | | | | | | | | | |
| A | | | | | | | | | | | | | | |
| III | | | | | | | | | | | | | | |
| HU | | | | | | | | | | | | | | |
| IV | | | | | | | | | | | | | | |
| VI | | | | | | | | | | | | | | |
| I | | | | | | | | | | | | | | |
| β | | | | | | | | | | | | | | |
| H4S | | | | | | | | | | | | | | |
| C | | | | | | | | | | | | | | |
| XIII | | | | | | | | | | | | | | |
| H2P | | | | | | | | | | | | | | |
| H3P | | | | | | | | | | | | | | |
| YH/W | | | | | | | | | | | | | | |
| II | | | | | | | | | | | | | | |
| PAIIS1 fl. | | | | | | | | | | | | | | |
| H5P | | | | | | | | | | | | | | |

Figure 11:
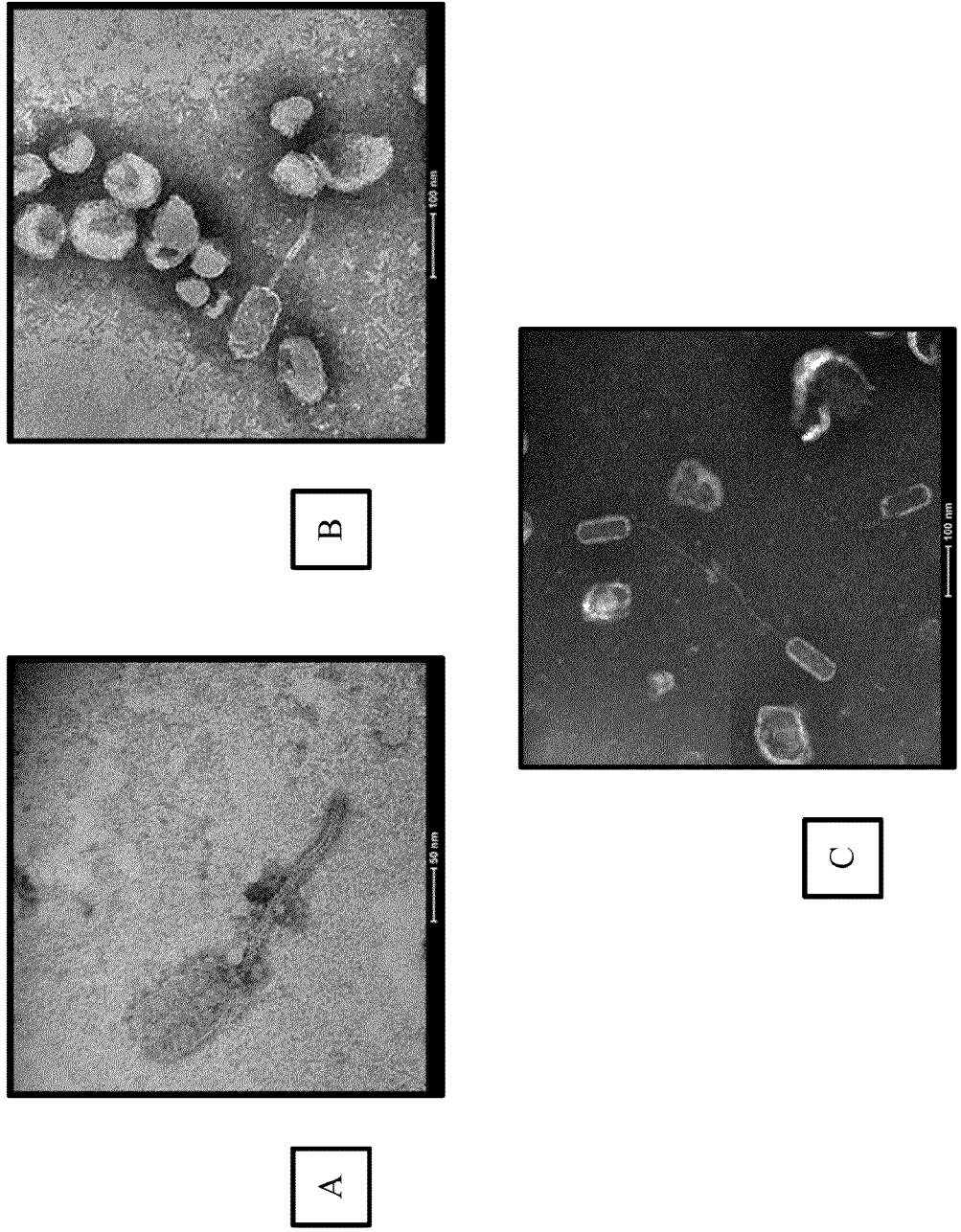

Comparison of Phage Morphology using TEM:

Results for 16 phages that were confidently imaged are given based on morphological descriptions only, and the following are the possible families of these isolated phages: 13 Siphoviridae, 1 Podoviridae, 1 potential Inoviridae, and 1 potential Tectoviridae (Table 8). Even among phages potentially classified under the same family, there are size variations of heads and tails. Sample images are presented in FIG. 11.

TABLE 8

Morphologies of chosen phages determined from TEM images

| Phage Designation | Head Shape | EM Imaging Comparison | | | |
|---|---|---|---|---|---|
| | | ~Head Length (nm) | ~Head Width (nm) | ~Tail Length (nm) | Possible Family |
| H1P | Elongated icosahedral | 109 | 55 | 227 | Siphoviridae |
| A | Elongated icosahedral | 114 | 71 | 212 | Siphoviridae |
| WA | Elongated icosahedral | 80 | 35 | 125 | Siphoviridae |
| H2S | Spherical icosahedral | 50 | 50 | 200 | Siphoviridae |
| F | Elongated icosahedral | 115 | 65 | 120 | Siphoviridae |
| H3S | Elongated icosahedral | 120 | 61 | 138 | Siphoviridae |
| PA1S2 - fl. | Elongated icosahedral | 87 | 41 | 190 | Siphoviridae |
| D | Elongated icosahedral | 94 | 47 | 106 | Siphoviridae |
| PAIS2 - med. cl. | Elongated icosahedral | 148 | 74 | 185 | Siphoviridae |
| V | Spherical icosahedral | 56 | 61 | 157 | Siphoviridae |

TABLE 8-continued

Morphologies of chosen phages determined from TEM images

EM Imaging Comparison

| Phage Designation | Head Shape | ~Head Length (nm) | ~Head Width (nm) | ~Tail Length (nm) | Possible Family |
|---|---|---|---|---|---|
| VIII | Spherical icosahedral | ND | ND | ND | Siphoviridae |
| H5S | Spherical icosahedral | 150 | 150 | 225 | Siphoviridae |
| Sigma | Spherical icosahedral | 128 | 109 | 309 | Siphoviridae |
| HIS | Spherical icosahedral | 70 | 84 | 40 | Podoviridae |
| E | No evident heads | | | Range from 200-500 | Inoviridae? |
| III | Spherical icosahedral | 110 | 110 | No evident tails | Tectoviridae? |

Images were provided by the CAMCOR facilities at the University of Oregon. Measurements are based on the averages of 2-4 images. Question mark indicates uncertainty of classification based on rarity of the family. Family classifications are based on descriptions of morphology only.

As described above, a total of 32 phages were isolated from 157 sources, suggesting that about 20% of the sources screened could yield phages capable of lysing *P. larvae*. In the host range results, the lack of clearing on other genera and only one incidence of slight clearing on a *Paenibacillus* sp., indicates high host specificity. As a potential treatment for AFB, such severe host specificity is encouraging because the microbial ecology of the hive is not well understood, and a lack of specificity could harm microbes not intentionally targeted with *P. larvae* phages. A spot test can be undertaken in future work to specifically test phages on the natural honeybee microbiota.

Using the most effective phages with the broadest host range on the 11 *P. larvae* strains, it may be possible to generate a cocktail that is capable of lysing 100% of the strains, using as few as the top three isolated phages (H1P, WA, and H1S). A more robust cocktail could be designed by testing the lysing capabilities of these isolated phages on additional strains of *P. larvae*. The use of a cocktail of multiple phages, rather than a single phage, may reduce the potential for development of phage resistance. Therefore, determining selection criteria for the most suitable phages is important. If an arbitrary proportion of strains lysed is chosen, for example 8 out of the 11, a phage cocktail capable of lysing all 11 strains with multiple phages capable of infecting each of the strains could be designed using 14 phages. Determining the effectiveness of a cocktail consisting of these 14 isolated phages will be the subject of future work in developing phage therapy as a potential treatment for AFB.

Example 2

Phage Therapy for Treating AFB in Honeybees

Materials and Methods

Bacterial Strains and Phage Isolates:

The following strains of *P. larvae* were used: NRRL B-2605, NRRL B-3554, NRRL B-3650, ATCC-25748, ATCC-25747, ATCC-49843, ATCC-25367, ATCC-25368, and ATCC-3688. In addition, two naturally occurring cultures isolated from infected hives were used: 2188 and 2231. Bacterial cultures were grown with the same media and under the same conditions described in the phage isolation methods from Alvarado et al. (supra). The phages had been previously isolated as described in Alvardo et al. (supra) and were selected from a pool of 32 total isolates based on the broadest host range of *P. larvae* strains.

Amplification and Quantification of Phage Titers:

Phage isolates were amplified prior to use in the experimental treatments. The procedures for amplification and quantification of phage titers were the same as those described by Alvarado et al. (supra).

Bacterial Cell and Spore Harvesting:

Eleven strains of *Paenibacillus larvae* were grown in 20 ml of GmBHI at 37° C. with shaking at 100 rpm. After overnight incubation, the turbid culture was pelleted by centrifugation, the supernatant discarded, and the cells resuspended in 200 µl sterile GmBHI broth. The concentrated cells were plated in serial dilutions using GmBHI agar plates and GmBHI sterile broth dilution blanks, and then colonies were counted to determine the colony forming units (CFU) of the concentrate. A volume of 200 µl of the concentrate was added to 1 ml of prepared larvae food, resulting in a titer of $10^5$ cells per total volume. Food was mixed by vortexing, then fed to larvae on a daily basis. New food was prepared with freshly grown bacterial cultures daily. Approximate numbers of CFUs being fed to each larva were calculated according to the final titers in the larvae food and amount of food fed to each larva per day (Table 9). Spores were prepared by first inducing sporulation then harvesting spores as described by the spore methods in Alvarado et al. (supra) with the exception of replacing the Histopenz (Sigma) density gradient with d-Sorbitol at the same concentrations. Spore concentration was calculated by serial dilution and plating of the final product. Calculations of spore load fed to each larva per day are given in Table 9.

Phage Cocktail Preparation:

Titers per ml of the amplified single phage lysates were determined as previously described and were as follows: H1P, $5 \times 10^4$; WA, $3 \times 10^6$; F, $5 \times 10^6$; V, $4 \times 10^5$; H2S, $10^4$; H3S, $4 \times 10^5$; XIII, $4 \times 10^6$; E, $10^4$; H5S, $9 \times 10^3$; VII, $2 \times 10^6$; D, $10^6$; PAIS2 fl, $9 \times 10^2$; and B, $5 \times 10^6$. Two separate cocktails were made. The first (phage cocktail #1 or PC1) contained 7 phages: H1P, WA, F, V, H2S, H3S, and XIII, and the second (phage cocktail #2 or PC2) contained all 13 phages. In both cases, however, the final titer of combined phages was about the same (phage cocktail #1, $1.8 \times 10^6$; phage cocktail #2, $1.6 \times 10^6$). Phage cocktail makeup was determined based on host range capabilities, and represents the broadest range of lysing capability on 11 different strains of *P. larvae*. A volume of 1 ml of each lysate was combined for the final phage cocktail. The final phage concentration was both calculated from initial titers and confirmed by soft agar overlay platings done in serial dilution after combination. A volume of 200 µL of each cocktail was added to 1 ml of prepared larvae food prior to feeding to larvae. Calculated PFUs fed to each larva per day are listed in Table 9.

TABLE 9

Volume of food and titers of phage, bacteria, and spores fed to larvae daily

| Days after Grafting | Day 0 | Day 1 | Day 2 | Day 3 | Day 4 | Day 5 | Day 6 | Day 7 | Day 8 |
|---|---|---|---|---|---|---|---|---|---|
| Volume of Larvae Food (μl) | 10 | 10 | 20 | 30 | 40 | 50 | 50 | 60 | 0 |
| Calculated # of CFUs (any strain) | 800 | 800 | 1600 | 2400 | 3200 | 4000 | 4000 | 4800 | 0 |
| Calculated # ATCC 49843 Spores | 100 | 100 | 200 | 300 | 400 | 500 | 500 | 600 | 0 |
| Calculated # NRRL B-3554 Spores | 90 | 90 | 180 | 270 | 360 | 450 | 450 | 540 | 0 |
| Calculated # Isolated 2188 Spores | 90 | 0 | 180 | 270 | 360 | 450 | 450 | 540 | 0 |
| Calculated Number of PFUs in PC1 | $3.00^3$ | $3.00^3$ | $6.00^3$ | $9.00^3$ | $1.20^4$ | $1.50^4$ | $1.50^4$ | $1.80^4$ | 0 |
| Calculated Number of PFUs in PC2 | $2.67^3$ | $2.67^3$ | $5.33^3$ | $8.00^3$ | $1.07^4$ | $1.33^4$ | $1.33^4$ | $1.60^4$ | 0 |

Larvae Food Preparation and Treatment:

Larvae food consisted of 14.4 ml sterile, distilled water, 4.2 g royal jelly powder (Glory Bee), 0.6 g glucose (Difco), 0.6 g fructose (Difco), and 0.2 g yeast extract (Difco) as described by Peng et al. (1992). The sugars and yeast extract were added to the water, this mixture was filtered, and then UV treated for 1 h. The royal jelly powder (4.2 g) was aseptically added to the water mixture but was otherwise untreated. The mixture was made homogenous by vortexing to ensure complete dispersion of the royal jelly. Food was prepared and stored at −20° C. until needed. Larvae were fed increasing amounts of food each day (Crailsheim et al., In: *The Coloss Beebook, Volume 1; Standard Methods for Apis mellifera Research, J Apicultural Research* 52:12012, 2012), as indicated in Table 9. As a negative control, larvae were fed larvae food without amendments while all other larvae were fed a mixture of food with treatment additives. In each case, 200 μL of concentrated spores, cells, or phage cocktails were added to 1 ml of larvae food as described above. Larvae were given the following treatments: negative control=food with no additives, broth control=food with GmBHI broth added to the same dilution as other additives, water control=food amended with 200 ul sterile water, food containing NRRL B-3554 vegetative cells, food amended with ATCC 49843 vegetative cells, food amended with isolated 2188 vegetative cells, food amended with NRRL B-3554 spores, food amended with ATCC 49843 spores, food amended with 2188 spores, prophylactic phage therapy treatments and post-infection phage therapy treatments (food amended with 200 ul phage cocktail #1 or #2). All larvae in the experimental phage cocktail treatments were infected with spores from *P. larvae* 2188. Two phage cocktails, phage cocktail #1 and phage cocktail #2, were tested in both the prophylactic and post-infection treatment experiments.

Larvae Rearing:

Larvae were reared by methods similar to those described by Crailsheim et al. (supra). Queens were caged using plastic or metal wire mesh about one week prior to the intended date of grafting larvae. While the queens were confined, the age and location of larvae in the frame were ensured. Eggs, turned to a horizontal position shortly before hatching, were then closely observed and the hatched larvae were grafted from the frames within a day after hatching. Each treatment included a corresponding negative control consisting of larvae taken from the same frame on the same day. Preliminary experiments were conducted by placing the grafted larvae into 96-well plates, but later were conducted by placing grafted larvae into sterile petri dishes (VWR) because survival rates were higher in larvae reared with more space. It appeared that higher survival rates were observed because the larvae food was not confined, leading to a lower chance of larval drowning. Incubation microcosms were created by placing 1 L of 10% glycerol in the bottom of plastic containers, followed by a layer of plastic support on which sat the well plates or petri dishes. The boxes were closed with loosely fitting plastic lids, allowing the humidity to be maintained at 90% within the microcosms. Metal trays filled with water were placed on the bottom of the incubator to maintain humidity within the incubator's interior at 80%. The temperature was kept at 34° C. Larvae were fed daily with the amount of food indicated in Table 9. On the eighth day after grafting, larvae were removed from the petri dishes and placed on sterile filter paper in new petri dishes outside the microcosms for pupation.

Figure 12:
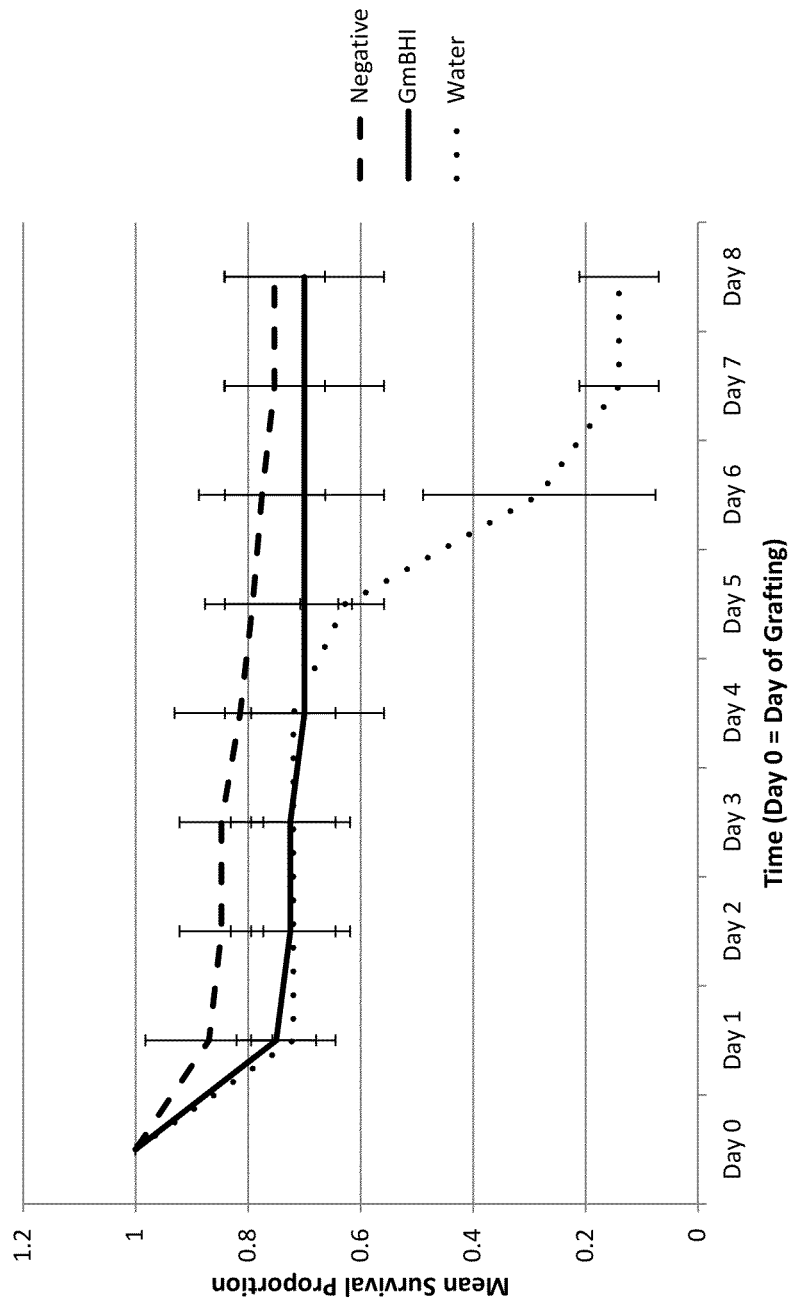

For the larvae controls, larvae were fed either unamended food, food diluted with GmBHI, or food diluted with water (FIG. 12). The negative control data represent three replicates with n=20, 21, and 15, the GmBHI data represent two replicates with n=20 each, and the water data represent two replicates with n=22 and 21.

Each experimental treatment also had a corresponding negative control prepared on the same day from the same frame and fed unamended food. Negative control data for FIGS. 13-17 represent the average of 10 control replicates with n=12 or 13. During the vegetative cell infection treatments, two replicates for each strain with samples sizes from 32 to 49 (mean size of 45 larvae) were prepared.

Larvae were fed ATCC 49843 and NRRL B-3554 spores daily. Two different treatments with 2188 spores were conducted—one in which larvae were fed spores daily and one in which only one dose of spores was administered on the first day. Spore treatment sample sizes ranged from 48-53 with a mean size of 50, and all spore infection treatments were conducted in duplicate.

Phage preparations were administered to larvae by adding the phage cocktails suspended in GmBHI to the larvae food (as previously described). Phage cocktail experiments were conducted in duplicate, and all phage cocktail treatment sample sizes ranged from 48-55, with a mean value of 51.

Daily Observations:

Larvae were viewed under a dissecting microscope (Nikon) daily and observed for signs of life that included opening and closing spiracles or food consumption. In the event that no movement was seen for the first 2 days, larvae were kept until day 3 in the event that they were alive but not producing easily visualized movement. On the third day, if no growth or movement was observed, larvae were assumed dead and removed. Samples of dead larvae were kept at −20° C. in 20% glycerol stocks for PCR analysis in order to determine whether bacterial DNA was present. The number of surviving larvae was recorded daily.

Lyophilization of Phage Cocktails:

Between 10 and 15 ml of individual amplified phage lysates were lyophilized separately (LabConco Lyophilizer). Samples were allowed to completely dry overnight. Once all liquid was removed, samples were weighed and equal amounts (0.02 g) of each powdered phage preparation were combined. This powdered mixture was easily transported to the field site. Experiments to ensure phage viability after lyophilization were conducted with reconstituted lyophilized phage. Powdered phage mixtures were resuspended in either water or sugar syrup (8.75 g sucrose/10 ml water) and plated to determine phage viability in diluents proposed for field study.

Field Resuspension of Phage and Spray Treatment on Hives:

Lyophilized phage preparations were taken to the field site near Bellingham, Wash., reconstituted with 10 ml of water, and then poured into 400 ml of sugar syrup. After shaking to homogenize the mixture, the entire volume was sprayed directly on alternating frames in the infected beehive. The following day, the sugar syrup mixture had been cleaned by the nurse bees and was no longer visible. Treatments occurred on June 26, June 28, July 10, July 23, and August 6. The first two treatments were administered in the presence of the beekeeper and the remaining three were conducted by the beekeeper. On each date, either odd or even numbered frames were sprayed with the sugar syrup/phage preparation.

Hive Observations:

Frames were selected on the first treatment day for qualitative visualization of the extent of the infection and were photographed on the first day as well as at each subsequent treatment. Gross comparisons of the frames were made over time, but detailed results were difficult to determine based on visualizations only. Additionally, the beekeeper reported the general state of the treated hive on a regular basis until the end of the treatments.

Post-Treatment Actions and Related Observations:

One month after the last phage treatment was administered, the beekeeper removed the worst of the diseased frames and replaced them with fresh, uninfected, and unpopulated frames. By October 11, the beekeeper reported no evidence of AFB in the hive, and as of the following January, no recurrence had been reported.

Statistical Analysis:

Student T tests were performed on all treatments and controls to determine the statistical significance of their comparisons. A significance value of $\alpha > 0.05$ was used throughout the study.

Results

Lab Experiments:

Results obtained from the control experiments are shown in FIG. 12. There was a significant difference between the survival of the negative control and the water control (p=0.002), and also between the survival of the GmBHI broth control and the water control (p=0.034), but not between the negative control and the GmBHI broth control (p=0.347).

Figure 13:
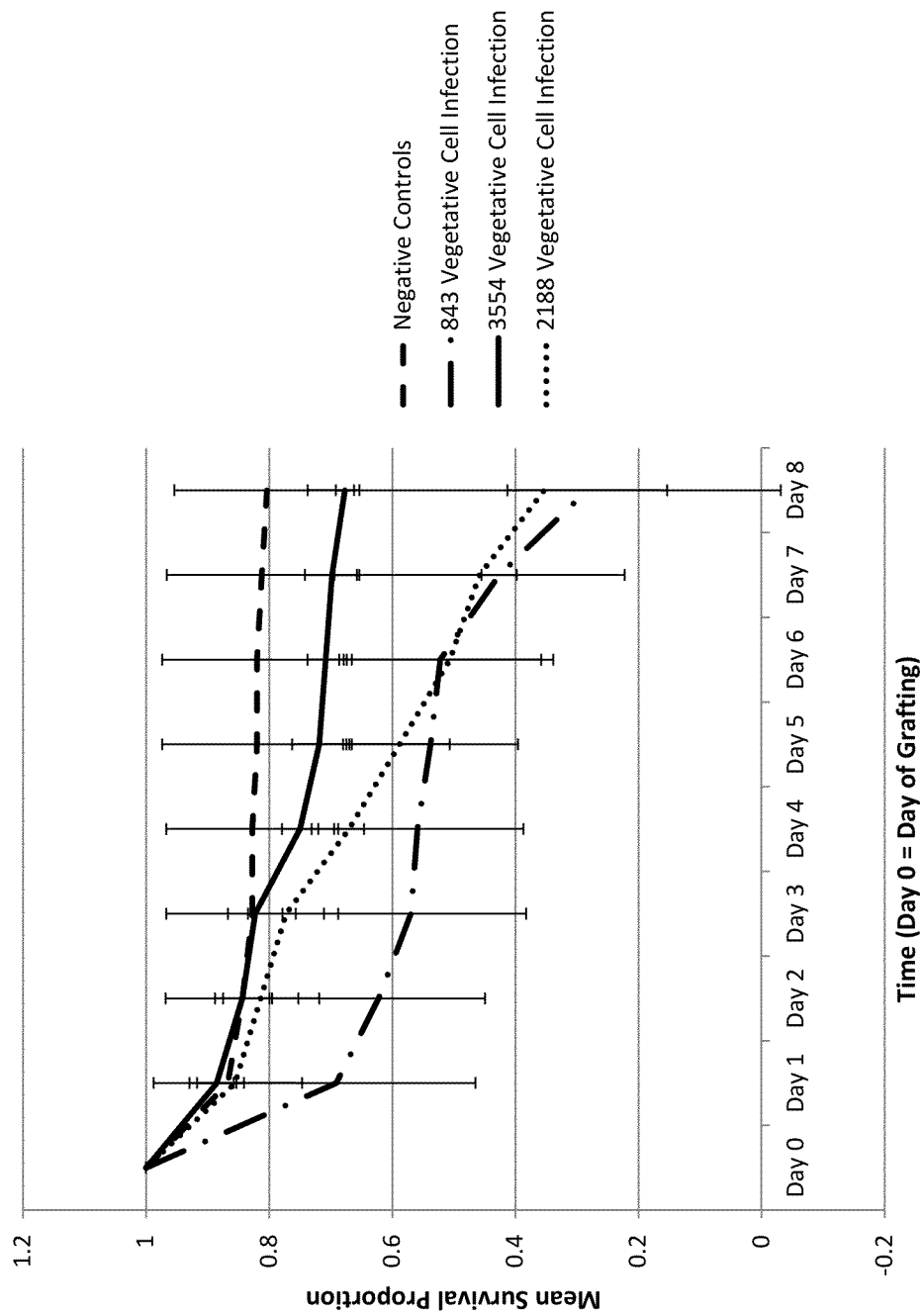

Results from the vegetative cell infection treatments are shown in FIG. 13. There was a significant difference in the larvae survival by day 8 between the negative control larvae and those infected with *P. larvae* ATCC 49843 (p=0.000548), as well as between the negative control larvae and those infected with *P. larvae* 2188 (p=0.00560), but not with larvae infected with NRRL B-3554 vegetative cells (p=0.139). The larvae infected with NRRL B-3554 that survived until pupation were incubated until pupation was complete, and the body mass was recorded for each fully pupated bee. Compared to the control bees, the mass of the infected bees was significantly lower (p=0.0035).

Figure 14:
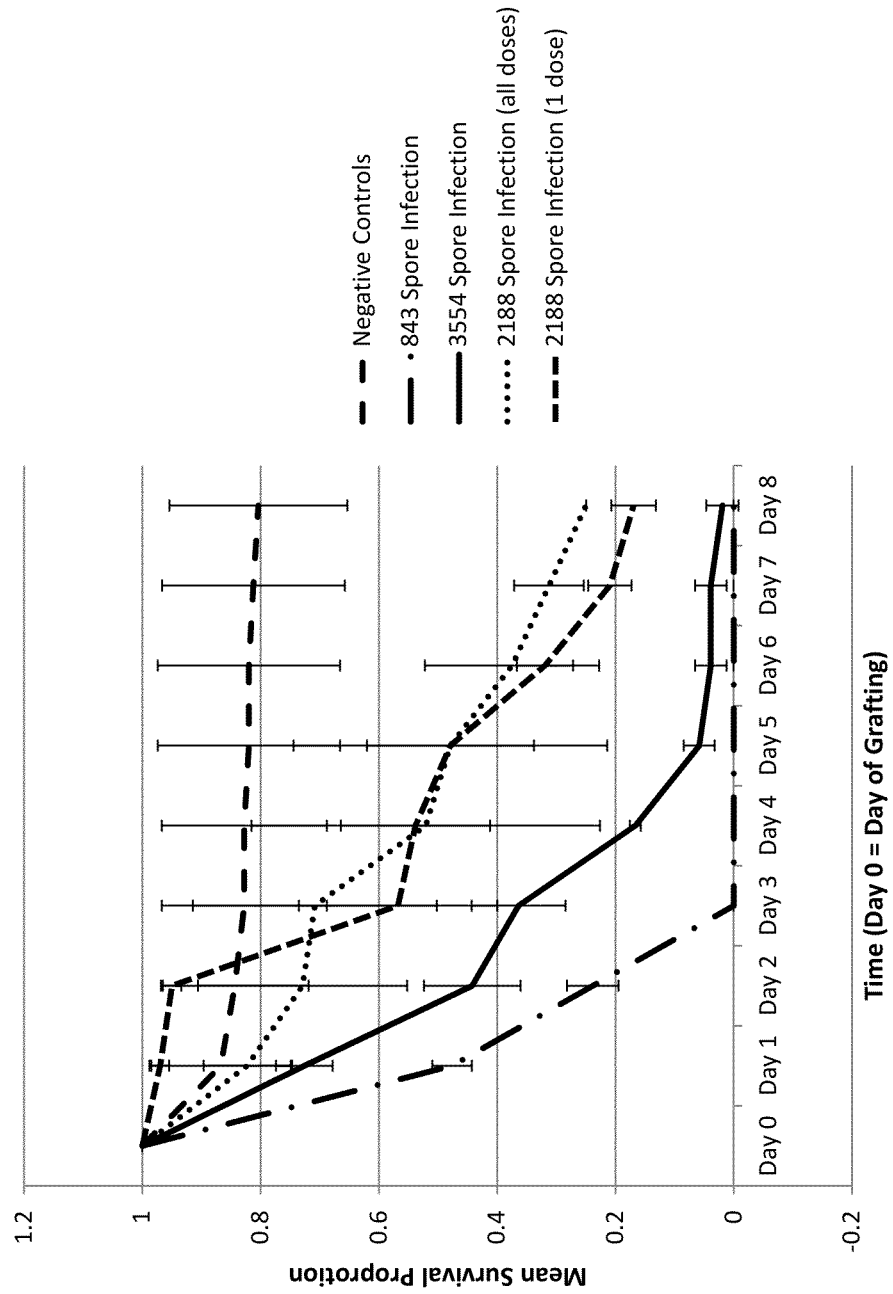

Spore infection experiments indicated a significant decrease in survival of larvae infected with spores from any of the three bacterial strains compared to the control (FIG. 14). There was a significant difference between the survival rates of the larvae infected with any of the spores and the negative control larvae ATCC 49843 (p=1.99E-8), NRRL B-3554 (p=1.79E-8), and the one dose spore infection with 2188 (p=4.97E-7), but there was not a significant difference in the survival rates of larvae fed only one dose of 2188 spores when compared to larvae fed daily doses of 2188 spores (p=0.102).

T-test comparisons between the larvae fed spores (FIG. 14) or vegetative cells (FIG. 13) of the same strains yielded the following: ATCC 49843 vegetative cells compared to spore infection, p=0.010; NRRL B-3554 vegetative cells compared to spore infection, p=0.002; 2188 vegetative cells compared to the 1-dose spore infection, p=0.384. There was a significant difference between the survival rates of larvae infected with spores of either ATCC 49843 or NRRL B-3554 compared to larvae infected with vegetative cells of the same strains. There was not, however, a significant difference between the survival rates of larvae by day 8 between those infected with spores or vegetative cells of 2188.

Figure 15:
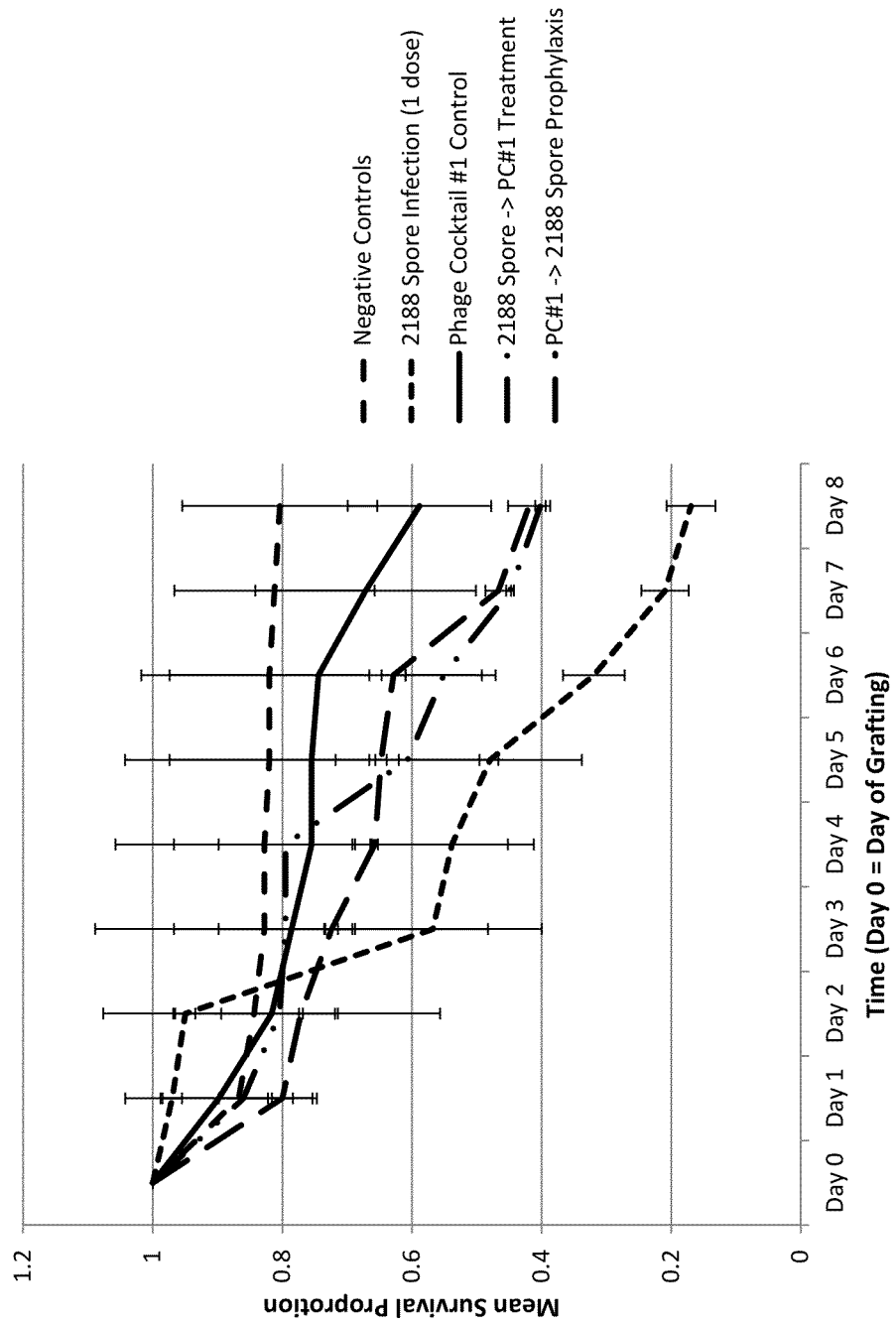

Results from phage cocktail #1 experiments are shown in FIG. 15. There was no statistically significant difference between the negative control and phage cocktail #1 control (p=0.077) or between the negative control and larvae infected with 1 dose of 2188 spores (p=0.045). Further, there was no statistically significant difference between larvae infected with 1 dose of 2188 spores and larvae treated with phage cocktail #1 after infection (p=0.031), between larvae infected with 1 dose of 2188 spores and larvae given phage as a prophylaxis prior to infection (p=0.010), between phage cocktail #1 control and larvae treated with phage after infection (p=0.126), between phage cocktail #1 control and larvae given phage as a prophylaxis prior to infection (p=0.128), or between the prophylaxis and the treatment regimens using phage cocktail #1 (p=0.293). There was a significant difference between the survival of larvae given phage cocktail versus infected with spores of 2188. There was not a significant difference between the survival of larvae given phage cocktail versus the negative control. There also was a significant difference in survival rates between both forms of phage treatment (either administered prior to or after infection) and infected larvae without treatment, but not between the survival of the treatments themselves.

Figure 16:
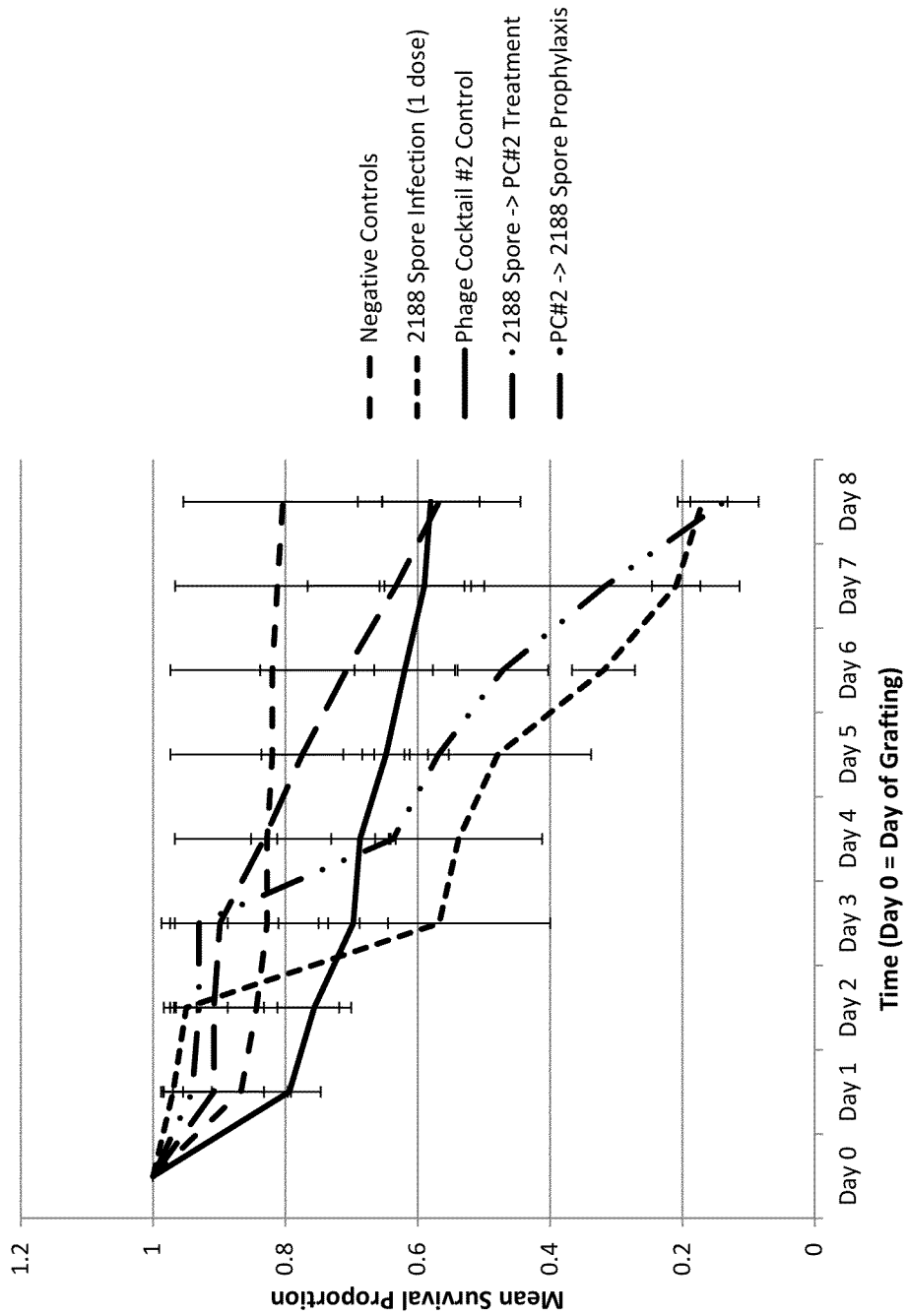

Results from the phage cocktail #2 experiments are shown in FIG. 16. T-test comparisons yield the following: comparison between the negative control and phage cocktail #2, p=0.069; comparison between the phage cocktail #2 and larvae infected with spores from 2188, p=0.002; comparison between larvae infected with spores and larvae treated with phage cocktail #2 after infection, p=0.271; comparison between larvae infected with spores and larvae given phage cocktail #2 as a prophylactic treatment prior to infection, p=0.024; and comparison between the prophylaxis and the treatment regimens using phage cocktail #2, p=0.044. Assuming $\alpha<0.05$, there was a significant difference between the phage cocktail #2 larvae and the infection control, but not between the phage cocktail #1 larvae and the negative control. There was not a significant difference between the infection control and the treatment regimen, but there was a significant difference between the infection control and the prophylaxis regimens. The survival of larvae treated with the phage cocktail prior to infection increased by 70%, and was comparable with the survival rates of the phage cocktail controls.

The efficacy of the two different phage cocktails was determined by comparing the data represented in FIG. 15 and FIG. 16. T-test comparisons yield the following: comparison between the prophylaxis treatment of phage cocktail #1 and phage cocktail #2, p=0.162; and comparison between the treatment regimen of phage cocktail #1 and phage cocktail #2, p=0.041. Assuming $\alpha<0.05$, there was a significant difference between the different phage cocktails when used as a treatment, but not when used as a prophylaxis.

Figure 17:
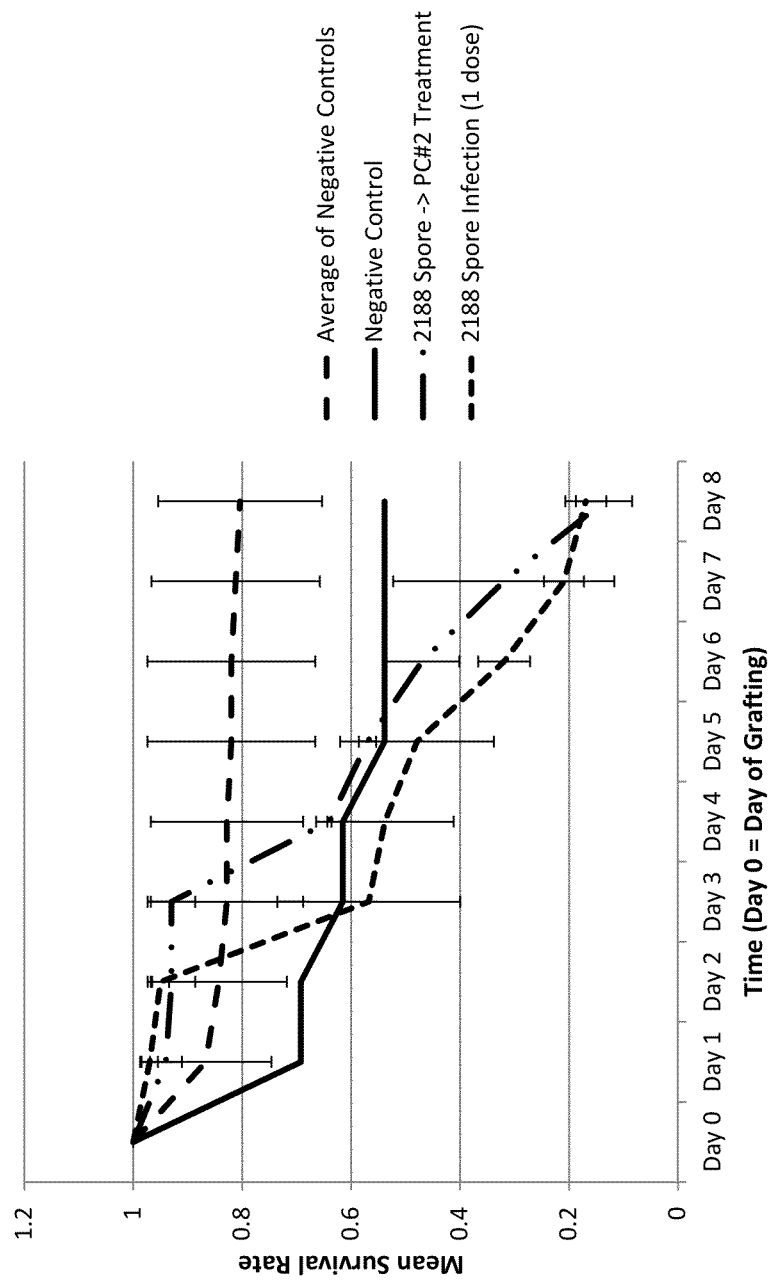

Further analysis of the anomalous, significantly lower survival with the phage cocktail #2 treatment is displayed in FIG. 17. Re-evaluation of the raw data revealed the corresponding negative control of the phage cocktail #2 treatment that was removed from the same frame on the same day to be much lower than the survival of the compiled average of all negative controls.

Figure 18:
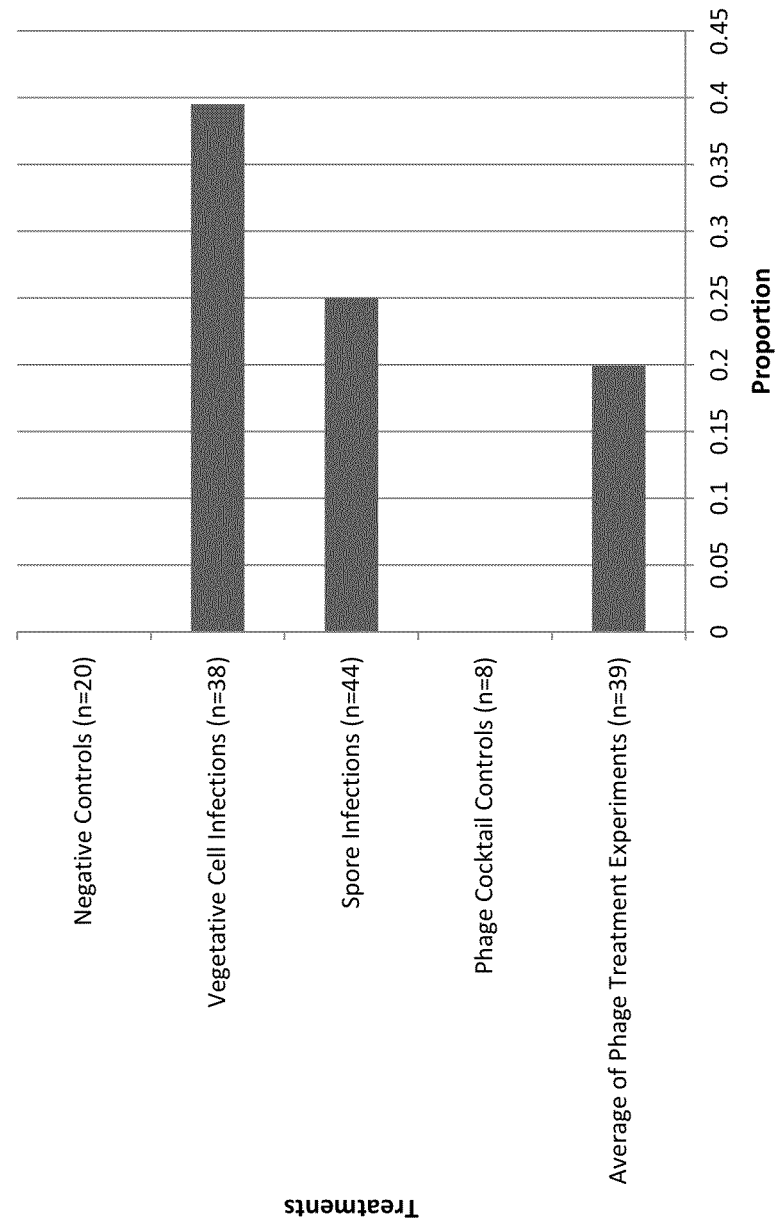

FIG. 18 shows the proportion of deceased larvae that tested positive for *P. larvae* DNA by PCR and gel electrophoresis (Piccini et al., *World J Microbiol Biotechnol* 18:761-765, 2002). Larvae obtained from negative control and phage cocktail control experiments (both of which had no bacteria added) showed no evidence of *P. larvae* DNA. About 40% of the larvae taken from vegetative cell experiments were positive for DNA, while about 25% of the larvae taken from spore experiments were positive for DNA. The average proportion of larvae positive for *P. larvae* DNA from phage cocktail treatments, regardless of whether phage was administered prior to or after spore infection, was slightly lower, at 20%

Field Experiment:

Experiments to determine phage viability after lyophilization were conducted to determine whether powered phage lysates were a practical option to use in a field setting. Prior to lyophilization, the average titer of multiple phage lysates was approximately $10^8$/ml. After lyophilization, the cocktails were resuspended in either sugar syrup or sterile water and the average of the resuspended cocktails was approximately $10^5$/ml. The resuspended phage cocktails were maintained at 4° C. for one month, and titers were then determined to be approximately $10^4$/ml.

Figure 19:
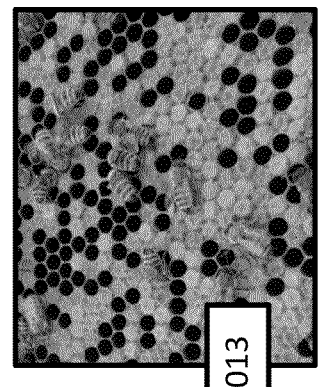
Figure 19:
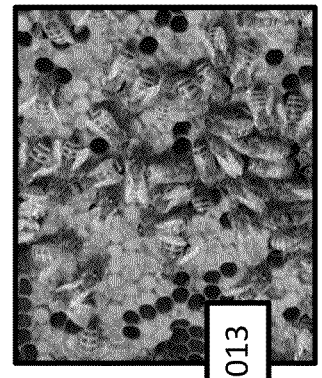

Pictures were taken of the same frames each time a treatment occurred, and observations were determined by the beekeeper. Pictures revealed a slight visual improvement during the treatment process, but not a complete eradication of the disease (FIG. 19). The comb was both darker and has more sunken capped cells (both characteristics of AFB) in the image taken on June 28. The beekeeper reported removing the diseased frames and replacing them with virgin, unpopulated frames after treatments had ended. Four months after the initial treatment, the beekeeper reported no visible sign of infection.

Samples were obtained after the treatment regimen ceased, and the procedures to isolate phage as previously described (Example 1) were conducted. It was determined that the phage from the administered phage cocktails were present in the hive after the five treatments had ended.

Taken together, these results indicate an overall improvement in survival when phage cocktails are administered to infected honeybee larvae. Prophylactic treatment with phage cocktail #1 was slightly more effective than the post infection treatment, although not significantly so, while prophylactic treatment with phage cocktail #2 was significantly more effective at increasing larval survival than post-infection treatment. This suggests that a prophylactic regimen may be more effective at preventing the disease than a post-infection treatment once a hive was already infected. Further, the higher survival of larvae that underwent prophylactic treatment with phage cocktail #2 than with phage cocktail #1 indicates that a cocktail with a greater number of different phages is more effective than a cocktail with fewer different phages. Although only one hive was experimentally treated in the field, the fact that the hive had no recurrence of AFB after about six months is promising. Thus, the results from these preliminary experiments indicate that phage therapy is useful for treating American Foulbrood disease.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of deterring a first strain of *Paenibacillus larvae* that is not *P. larvae* 2605, comprising providing to an environment of a bee hive infected with the first strain of *P. larvae* an isolated lytic phage that lyses *P. larvae* 2605 and deters productive replication of *P. larvae* 2605.

2. The method of claim 1, wherein the lysing phage is provided by delivering food for bees that contains the lysing phage to the bee hive.

3. The method of claim 2, wherein lysing of the first strain of *P. larvae* causes a hole in the peptidoglycan of a cell wall of the first strain of *P. larvae* and cell membrane of the first strain of *P. larvae* which is externalized after internal pressure force the cell membrane outside the hole in the cell wall, leading to rupture of the cell membrane and loss of intercellular components.

4. The method of claim 3, wherein rupture of the cell membrane leads to death of the first strain of *P. larvae*.

5. The method of claim 1, wherein lysing of the first strain of *P. larvae* causes a hole in the peptidoglycan of a cell wall of the first strain of *P. larvae* and cell membrane of the first strain of *P. larvae* which is externalized after internal pressure force the cell membrane outside the hole in the cell wall, leading to rupture of the cell membrane and loss of intercellular components.

6. The method of claim 5, wherein rupture of the cell membrane leads to death of the first strain of *P. larvae*.

7. A method of deterring a first strain of *P. larvae* that is not *P. larvae* 2605, comprising providing to an environment of a bee hive infected with the first strain of *P. larvae* a lysing phage that lyses *P. larvae* 2605 and at least two other strains of *P. larvae* selected from the group consisting of strains having been deposited under ATCC® Accession Number 9545, ATCC® Accession Number 25367, ATCC® Accession Number 25368, ATCC® Accession Number 25747, ATCC® Accession Number 25748, and ATCC® Accession Number 49843.

8. The method of claim 7, wherein the lysing phage is provided by delivering food for bees that contains the lysing phage to the bee hive.

9. The method of claim 7, wherein lysing of the first strain of *P. larvae* causes a hole in the peptidoglycan of a cell wall of the first strain of *P. larvae* and cell membrane of the first strain of *P. larvae* which is externalized after internal pressure force the cell membrane outside the hole in the cell wall, leading to rupture of the cell membrane and loss of intercellular components.

10. The method of claim 9, wherein rupture of the cell membrane leads to death of the first strain of *P. larvae*.

11. The method of claim 10, wherein the first strain of *P. larvae* that is not *P. larvae* 2605 deters productive replication of *P. larvae* 2605 and the at least two other strains of *P. larvae*.

12. The method of claim 9, wherein the first strain of *P. larvae* that is not *P. larvae* 2605 deters productive replication of *P. larvae* 2605 and the at least two other strains of *P. larvae*.

* * * * *